United States Patent
McMillen et al.

(10) Patent No.: US 10,802,641 B2
(45) Date of Patent: Oct. 13, 2020

(54) PIEZORESISTIVE SENSORS AND APPLICATIONS

(71) Applicant: BeBop Sensors, Inc., Berkeley, CA (US)

(72) Inventors: Keith A. McMillen, Berkeley, CA (US); Daniel Eric McAnulty, Oakland, CA (US)

(73) Assignee: BeBop Sensors, Inc., Berkeley, CA (US)

( * ) Notice: Subject to any disclaimer, the term of this patent is extended or adjusted under 35 U.S.C. 154(b) by 53 days.

(21) Appl. No.: 16/148,570

(22) Filed: Oct. 1, 2018

(65) Prior Publication Data

US 2019/0034019 A1    Jan. 31, 2019

Related U.S. Application Data

(63) Continuation of application No. 14/728,873, filed on Jun. 2, 2015, now Pat. No. 10,114,493, which is a
(Continued)

(51) Int. Cl.
*G10H 3/14*    (2006.01)
*G06F 3/041*    (2006.01)
(Continued)

(52) U.S. Cl.
CPC ............. *G06F 3/0414* (2013.01); *G06F 1/16* (2013.01); *G06F 3/0416* (2013.01); *G06F 3/0485* (2013.01); *G06F 3/0488* (2013.01); *G06F 3/04847* (2013.01); *G10H 1/00* (2013.01); *G10H 1/0008* (2013.01); *G10H 1/02* (2013.01);
(Continued)

(58) Field of Classification Search
CPC ........ G06F 3/0414; G06F 1/16; G06F 3/0416; G06F 3/04847; G06F 3/0485; G06F 3/0488; G06F 2203/04104; G06F 2203/04105; G10H 1/00; G10H 1/0008; G10H 1/02;
(Continued)

(56) References Cited

U.S. PATENT DOCUMENTS

| 4,294,014 A | 10/1981 | Baumann et al. |
| 4,438,291 A | 3/1984 | Eichelberger et al. |

(Continued)

FOREIGN PATENT DOCUMENTS

| CN | 200980381 Y | 11/2007 |
| CN | 201920728 U | 8/2011 |

(Continued)

OTHER PUBLICATIONS

U.S. Office Action dated Sep. 12, 2012 issued in U.S. Appl. No. 12/904,657.
(Continued)

*Primary Examiner* — Jianchun Qin
(74) *Attorney, Agent, or Firm* — Weaver Austin Villeneuve & Sampson LLP

(57) ABSTRACT

A highly configurable controller is described that includes a number of different types of control mechanisms that emulate a wide variety of conventional control mechanisms using pressure and location sensitive sensors that generate high-density control information which may be mapped to the controls of a wide variety of devices and software.

23 Claims, 16 Drawing Sheets

Related U.S. Application Data continuation of application No. 13/799,304, filed on Mar. 13, 2013, now Pat. No. 9,076,419.

(60) Provisional application No. 61/610,924, filed on Mar. 14, 2012.

(51) Int. Cl.
| | | |
|---|---|---|
| *G10H 1/02* | (2006.01) | |
| *G10H 1/00* | (2006.01) | |
| *G10H 1/055* | (2006.01) | |
| *G06F 1/16* | (2006.01) | |
| *G06F 3/0484* | (2013.01) | |
| *G06F 3/0485* | (2013.01) | |
| *G06F 3/0488* | (2013.01) | |
| *G10H 1/34* | (2006.01) | |

(52) U.S. Cl.
CPC ............ *G10H 1/0556* (2013.01); *G10H 1/34* (2013.01); *G06F 2203/04104* (2013.01); *G06F 2203/04105* (2013.01); *G10H 2220/061* (2013.01); *G10H 2220/096* (2013.01); *G10H 2230/015* (2013.01)

(58) Field of Classification Search
CPC .. G10H 1/0556; G10H 1/34; G10H 2220/061; G10H 2220/096; G10H 2230/015
USPC .......................................................... 84/734
See application file for complete search history.

(56) References Cited

U.S. PATENT DOCUMENTS

| | | | |
|---|---|---|---|
| 4,489,302 A | | 12/1984 | Eventoff |
| 4,515,404 A | | 5/1985 | Nishimura et al. |
| 4,693,530 A | | 9/1987 | Stillie et al. |
| 4,734,034 A | | 3/1988 | Maness et al. |
| 4,745,301 A | | 5/1988 | Michalchik |
| 4,790,968 A | | 12/1988 | Ohkawa et al. |
| 4,852,443 A | | 8/1989 | Duncan et al. |
| 5,033,291 A | | 7/1991 | Podoloff et al. |
| 5,079,949 A | * | 1/1992 | Tamori .................. G06F 3/045 |
| | | | 338/99 |
| 5,128,880 A | | 7/1992 | White |
| 5,131,306 A | | 7/1992 | Yamamoto |
| 5,159,159 A | | 10/1992 | Asher |
| 5,219,292 A | | 6/1993 | Dickirson et al. |
| 5,237,520 A | | 8/1993 | White |
| 5,288,938 A | | 2/1994 | Wheaton |
| 5,316,017 A | | 5/1994 | Edwards et al. |
| 5,386,720 A | | 2/1995 | Toda et al. |
| 5,429,092 A | | 7/1995 | Kamei |
| 5,571,973 A | | 11/1996 | Taylot |
| 5,578,766 A | | 11/1996 | Kondo |
| 5,624,132 A | | 4/1997 | Blackburn et al. |
| 5,659,395 A | | 8/1997 | Brown et al. |
| 5,695,859 A | | 12/1997 | Burgess |
| 5,729,905 A | | 3/1998 | Mathiasmeier et al. |
| 5,822,223 A | | 10/1998 | Genest |
| 5,866,829 A | | 2/1999 | Pecoraro |
| 5,878,359 A | | 3/1999 | Takeda |
| 5,943,044 A | | 8/1999 | Martinelli et al. |
| 5,989,700 A | | 11/1999 | Krivopal |
| 6,029,358 A | | 2/2000 | Mathiasmeier et al. |
| 6,032,109 A | | 2/2000 | Ritmiller, III |
| 6,049,327 A | | 4/2000 | Walker et al. |
| 6,087,930 A | | 7/2000 | Kulka et al. |
| 6,121,869 A | | 9/2000 | Burgess |
| 6,141,643 A | | 10/2000 | Harmon |
| 6,155,120 A | * | 12/2000 | Taylor .................. A61B 5/1036 |
| | | | 73/862.046 |
| 6,215,055 B1 | | 4/2001 | Saravis |
| 6,216,545 B1 | | 4/2001 | Taylor |
| 6,304,840 B1 | | 10/2001 | Vance et al. |
| 6,331,893 B1 | | 12/2001 | Brown et al. |
| 6,360,615 B1 | | 3/2002 | Smela |
| 6,388,556 B1 | | 5/2002 | Imai et al. |
| 6,452,479 B1 | | 9/2002 | Sandbach |
| 6,486,776 B1 | | 11/2002 | Pollack et al. |
| 6,490,515 B1 | | 12/2002 | Okamura et al. |
| 6,531,951 B2 | | 3/2003 | Serban et al. |
| 6,609,054 B2 | | 8/2003 | Wallace |
| 6,626,046 B2 | | 9/2003 | Taguchi et al. |
| 6,687,523 B1 | | 2/2004 | Jayaramen et al. |
| 6,763,320 B2 | | 7/2004 | Kimble |
| 6,815,602 B2 | | 11/2004 | De Franco |
| 6,822,635 B2 | | 11/2004 | Shahoian et al. |
| 6,829,942 B2 | | 12/2004 | Yanai et al. |
| 6,964,205 B2 | | 11/2005 | Papakostas et al. |
| 7,037,268 B1 | | 5/2006 | Sleva et al. |
| 7,066,887 B2 | | 6/2006 | Flesch et al. |
| 7,109,068 B2 | | 9/2006 | Akram et al. |
| 7,113,856 B2 | | 9/2006 | Theiss et al. |
| 7,138,976 B1 | | 11/2006 | Bouzit et al. |
| 7,157,640 B2 | | 1/2007 | Baggs |
| 7,162,344 B2 | | 1/2007 | Kojima et al. |
| 7,302,866 B1 | | 12/2007 | Malkin et al. |
| 7,311,009 B2 | | 12/2007 | Kotovsky |
| 7,332,670 B2 | | 2/2008 | Fujiwara et al. |
| 7,409,256 B2 | | 8/2008 | Lin et al. |
| 7,439,465 B2 | | 10/2008 | Parkinson |
| 7,483,866 B2 | | 1/2009 | Luo |
| 7,493,230 B2 | | 2/2009 | Schwartz et al. |
| 7,536,794 B2 | | 5/2009 | Hay et al. |
| 7,584,666 B2 | | 9/2009 | Kim et al. |
| 7,608,776 B2 | | 10/2009 | Ludwig |
| 7,719,007 B2 | | 5/2010 | Tompkins et al. |
| 7,726,199 B2 | | 6/2010 | Shkel et al. |
| 7,754,956 B2 | | 7/2010 | Gain et al. |
| 7,780,541 B2 | | 8/2010 | Bauer |
| 7,855,718 B2 | | 12/2010 | Westerman |
| 7,928,312 B2 | | 4/2011 | Sharma |
| 7,984,544 B2 | | 7/2011 | Rosenberg |
| 8,109,149 B2 | | 2/2012 | Kotovsky |
| 8,117,922 B2 | | 2/2012 | Xia et al. |
| 8,120,232 B2 | | 2/2012 | Daniel et al. |
| 8,127,623 B2 | | 3/2012 | Son et al. |
| 8,161,826 B1 | | 4/2012 | Taylor |
| 8,162,857 B2 | | 4/2012 | Lanfermann et al. |
| 8,250,934 B2 | | 8/2012 | Sakurai |
| 8,274,485 B2 | | 9/2012 | Liu et al. |
| 8,346,684 B2 | | 1/2013 | Mirbach et al. |
| 8,368,505 B2 | | 2/2013 | Deppiesse et al. |
| 8,448,530 B2 | | 5/2013 | Leuenberger et al. |
| 8,479,585 B2 | | 7/2013 | Shaw-Klein |
| 8,536,880 B2 | | 9/2013 | Philipp |
| 8,571,827 B2 | | 10/2013 | Jang et al. |
| 8,587,422 B2 | | 11/2013 | Andrews et al. |
| 8,661,917 B2 | | 3/2014 | Jheng et al. |
| 8,680,390 B2 | | 3/2014 | McMillen et al. |
| 8,813,579 B2 | | 8/2014 | Aufrere |
| 8,857,274 B2 | | 10/2014 | Mamigonians |
| 8,880,358 B2 | | 11/2014 | Cunningham |
| 8,884,913 B2 | | 11/2014 | Saynac et al. |
| 8,892,051 B2 | | 11/2014 | Yi et al. |
| 8,893,565 B2 | | 11/2014 | White et al. |
| 8,904,876 B2 | | 12/2014 | Taylor et al. |
| 8,925,392 B2 | | 1/2015 | Esposito et al. |
| 8,925,393 B2 | | 1/2015 | Cannard et al. |
| 8,928,014 B2 | | 1/2015 | Tischler et al. |
| 8,945,328 B2 | | 2/2015 | Longinotti-Buitoni et al. |
| 8,947,889 B2 | | 2/2015 | Kelley et al. |
| 8,950,265 B2 | | 2/2015 | Dunn et al. |
| 8,964,205 B2 | | 2/2015 | Shimizu |
| 8,970,513 B2 | | 3/2015 | Kwon et al. |
| 9,032,804 B2 | | 5/2015 | Granado et al. |
| 9,038,482 B2 | | 5/2015 | Xia et al. |
| 9,075,404 B2 | | 7/2015 | McMillen et al. |
| 9,076,419 B2 | | 7/2015 | McMillen et al. |
| 9,112,058 B2 | | 8/2015 | Bao et al. |
| 9,116,569 B2 | | 8/2015 | William et al. |
| 9,164,586 B2 | | 10/2015 | Zellers et al. |
| 9,182,302 B2 | | 11/2015 | Lim et al. |

(56) References Cited

U.S. PATENT DOCUMENTS

| | | |
|---|---|---|
| 9,271,665 B2 | 3/2016 | Sarrafzadeh et al. |
| 9,413,376 B2 | 8/2016 | Lowe et al. |
| 9,417,693 B2 | 8/2016 | Seth |
| 9,442,614 B2 | 9/2016 | McMillen |
| 9,480,582 B2 | 11/2016 | Lundborg |
| 9,529,433 B2 | 12/2016 | Shankar et al. |
| 9,546,921 B2 | 1/2017 | McMillen et al. |
| 9,582,035 B2 | 2/2017 | Connor |
| 9,612,102 B2 | 4/2017 | Reese et al. |
| 9,652,101 B2 | 5/2017 | McMillen et al. |
| 9,682,856 B2 | 6/2017 | Whitesides et al. |
| 9,696,223 B2 | 7/2017 | Lisseman et al. |
| 9,696,833 B2 | 7/2017 | McMillen |
| 9,710,060 B2 | 7/2017 | McMillen et al. |
| 9,721,553 B2 | 8/2017 | McMillen et al. |
| 9,753,568 B2 | 9/2017 | McMillen |
| 9,756,895 B2 | 9/2017 | Rice et al. |
| 9,827,996 B2 | 11/2017 | McMillen |
| 9,836,151 B2 | 12/2017 | McMillen |
| 9,851,267 B1 | 12/2017 | Ma et al. |
| 9,863,823 B2 | 1/2018 | McMillen |
| 9,891,718 B2 | 2/2018 | Connor |
| 9,965,076 B2 | 5/2018 | McMillen |
| 9,970,832 B2 | 5/2018 | Hong et al. |
| 9,993,921 B2 | 6/2018 | Lessing et al. |
| 10,046,671 B2 | 8/2018 | Seiller et al. |
| 10,076,143 B2 | 9/2018 | Marriott et al. |
| 10,082,381 B2 | 9/2018 | McMillen et al. |
| 10,114,493 B2 | 10/2018 | McMillen et al. |
| 10,268,315 B2 | 4/2019 | McMillen et al. |
| 10,282,011 B2 | 5/2019 | McMillen et al. |
| 10,288,507 B2 | 5/2019 | McMillen et al. |
| 10,352,787 B2 | 7/2019 | McMillen et al. |
| 10,362,989 B2 | 7/2019 | McMillen et al. |
| 10,654,486 B2 | 5/2020 | McMillen et al. |
| 2002/0078757 A1 | 6/2002 | Hines et al. |
| 2002/0180578 A1 | 12/2002 | Sandbach |
| 2004/0031180 A1 | 2/2004 | Ivanov |
| 2004/0093746 A1 | 5/2004 | Varsallona |
| 2004/0118619 A1 | 6/2004 | Gray et al. |
| 2004/0183648 A1 | 9/2004 | Weber et al. |
| 2004/0189145 A1 | 9/2004 | Pletner et al. |
| 2004/0249536 A1 | 12/2004 | Hattori |
| 2004/0252007 A1 | 12/2004 | Lussey et al. |
| 2005/0072249 A1 | 4/2005 | Maeda et al. |
| 2005/0109095 A1 | 5/2005 | Sinnett |
| 2005/0220673 A1 | 10/2005 | Thaysen |
| 2006/0103192 A1 | 5/2006 | Norton |
| 2006/0150752 A1 | 7/2006 | Lorenz et al. |
| 2006/0192417 A1 | 8/2006 | Ellinger et al. |
| 2006/0209050 A1 | 9/2006 | Serban |
| 2007/0063992 A1 | 3/2007 | Lundquist |
| 2007/0129776 A1 | 6/2007 | Robins et al. |
| 2007/0151348 A1 | 7/2007 | Zdeblick et al. |
| 2007/0188179 A1 | 8/2007 | Deangelis et al. |
| 2007/0188180 A1 | 8/2007 | Deangelis et al. |
| 2007/0202765 A1 | 8/2007 | Krans et al. |
| 2007/0234888 A1 | 10/2007 | Rotolo de Moraes |
| 2008/0046152 A1 | 2/2008 | Ohtake et al. |
| 2008/0069412 A1 | 3/2008 | Champagne et al. |
| 2008/0158145 A1 | 7/2008 | Westerman |
| 2008/0189827 A1 | 8/2008 | Bauer |
| 2008/0254824 A1 | 10/2008 | Moraes |
| 2009/0013793 A1 | 1/2009 | Kim et al. |
| 2009/0049980 A1 | 2/2009 | Sharma |
| 2009/0134966 A1 | 5/2009 | Baker |
| 2009/0237374 A1 | 9/2009 | Li et al. |
| 2009/0272197 A1 | 11/2009 | Granado et al. |
| 2009/0301190 A1 | 12/2009 | Ross, Jr. et al. |
| 2009/0303400 A1 | 12/2009 | Hou et al. |
| 2010/0066572 A1 | 3/2010 | Dietz et al. |
| 2010/0123686 A1 | 5/2010 | Klinghult et al. |
| 2010/0134327 A1 | 6/2010 | Dinh et al. |
| 2010/0149108 A1 | 6/2010 | Hotelling et al. |
| 2010/0179724 A1 | 7/2010 | Weston |
| 2010/0199777 A1 | 8/2010 | Hooper et al. |
| 2010/0242274 A1 | 9/2010 | Rosenfeld et al. |
| 2010/0274447 A1 | 10/2010 | Stumpf |
| 2010/0286951 A1 | 11/2010 | Danenberg et al. |
| 2010/0292945 A1 | 11/2010 | Reynolds et al. |
| 2010/0315337 A1 | 12/2010 | Ferren et al. |
| 2011/0005090 A1 | 1/2011 | Lee et al. |
| 2011/0088535 A1 | 4/2011 | Zarimis |
| 2011/0088536 A1 | 4/2011 | McMillen et al. |
| 2011/0107771 A1 | 5/2011 | Crist et al. |
| 2011/0141052 A1 | 6/2011 | Bernstein et al. |
| 2011/0153261 A1 | 6/2011 | Jang et al. |
| 2011/0199284 A1 | 8/2011 | Davis et al. |
| 2011/0221564 A1 | 9/2011 | Deppiesse et al. |
| 2011/0241850 A1 | 10/2011 | Bosch et al. |
| 2011/0246028 A1 | 10/2011 | Lisseman et al. |
| 2011/0260994 A1 | 10/2011 | Saynac et al. |
| 2011/0271772 A1 | 11/2011 | Parks et al. |
| 2011/0279409 A1 | 11/2011 | Salaverry et al. |
| 2011/0292049 A1 | 12/2011 | Muravsky |
| 2011/0302694 A1 | 12/2011 | Wang et al. |
| 2012/0007831 A1 | 1/2012 | Chang et al. |
| 2012/0024132 A1 | 2/2012 | Wallace et al. |
| 2012/0026124 A1 | 2/2012 | Li et al. |
| 2012/0055257 A1 | 3/2012 | Shaw-Klein |
| 2012/0090408 A1 | 4/2012 | Jheng et al. |
| 2012/0143092 A1 | 6/2012 | Xia et al. |
| 2012/0191554 A1 | 7/2012 | Xia et al. |
| 2012/0197161 A1 | 8/2012 | Xia et al. |
| 2012/0198949 A1 | 8/2012 | Xia et al. |
| 2012/0222498 A1 | 9/2012 | Mamigonians |
| 2012/0234105 A1 | 9/2012 | Taylor |
| 2012/0283979 A1 | 11/2012 | Bruekers et al. |
| 2012/0296528 A1 | 11/2012 | Wellhoefer et al. |
| 2012/0297885 A1 | 11/2012 | Hou et al. |
| 2012/0299127 A1 | 11/2012 | Fujii et al. |
| 2012/0312102 A1 | 12/2012 | Alvarez |
| 2012/0323501 A1 | 12/2012 | Sarrafzadeh et al. |
| 2013/0009905 A1 | 1/2013 | Castillo et al. |
| 2013/0055482 A1 | 3/2013 | D'Aprile et al. |
| 2013/0082970 A1 | 4/2013 | Frey et al. |
| 2013/0085394 A1 | 4/2013 | Corbett, III et al. |
| 2013/0113057 A1 | 5/2013 | Taylor |
| 2013/0113704 A1 | 5/2013 | Sarrafzadeh et al. |
| 2013/0165809 A1 | 6/2013 | Abir |
| 2013/0192071 A1 | 8/2013 | Esposito et al. |
| 2013/0203201 A1 | 8/2013 | Britton et al. |
| 2013/0211208 A1 | 8/2013 | Varadan et al. |
| 2013/0214365 A1 | 8/2013 | Schlarmann et al. |
| 2013/0239787 A1 | 9/2013 | McMillen et al. |
| 2013/0248024 A1 | 9/2013 | Dunn et al. |
| 2013/0274985 A1 | 10/2013 | Lee et al. |
| 2013/0275057 A1 | 10/2013 | Perlin et al. |
| 2013/0327560 A1 | 12/2013 | Ichiki |
| 2013/0340598 A1 | 12/2013 | Marquez et al. |
| 2014/0007704 A1 | 1/2014 | Granado et al. |
| 2014/0007706 A1 | 1/2014 | Aufrere et al. |
| 2014/0013865 A1 | 1/2014 | White et al. |
| 2014/0026678 A1 | 1/2014 | Cannard et al. |
| 2014/0033829 A1 | 2/2014 | Xia et al. |
| 2014/0090488 A1 | 4/2014 | Taylor et al. |
| 2014/0104776 A1 | 4/2014 | Clayton et al. |
| 2014/0104792 A1 | 4/2014 | Jeziorek |
| 2014/0107966 A1 | 4/2014 | Xia et al. |
| 2014/0107967 A1 | 4/2014 | Xia et al. |
| 2014/0107968 A1 | 4/2014 | Xia et al. |
| 2014/0125124 A1 | 5/2014 | Verner |
| 2014/0130593 A1 | 5/2014 | Ciou et al. |
| 2014/0150573 A1 | 6/2014 | Cannard et al. |
| 2014/0182170 A1 | 7/2014 | Wawrousek et al. |
| 2014/0195023 A1 | 7/2014 | Statham et al. |
| 2014/0215684 A1 | 8/2014 | Hardy et al. |
| 2014/0222173 A1 | 8/2014 | Giedwoyn et al. |
| 2014/0222243 A1 | 8/2014 | McMillen et al. |
| 2014/0238153 A1 | 8/2014 | Wood et al. |
| 2014/0240214 A1 | 8/2014 | Liu et al. |
| 2014/0264407 A1 | 9/2014 | Tischler et al. |
| 2014/0318699 A1 | 10/2014 | Longinotti-Buitoni et al. |
| 2014/0347076 A1 | 11/2014 | Barton et al. |

(56) References Cited

U.S. PATENT DOCUMENTS

| | | |
|---|---|---|
| 2015/0035743 A1 | 2/2015 | Rosener |
| 2015/0084873 A1 | 3/2015 | Hagenbuch et al. |
| 2015/0086955 A1 | 3/2015 | Poniatowski et al. |
| 2015/0130698 A1 | 5/2015 | Burgess |
| 2015/0168238 A1 | 6/2015 | Raut et al. |
| 2015/0177080 A1 | 6/2015 | Esposito et al. |
| 2015/0231991 A1 | 8/2015 | Yetukuri et al. |
| 2015/0248159 A1 | 9/2015 | Luo et al. |
| 2015/0261372 A1 | 9/2015 | McMillen et al. |
| 2015/0316434 A1 | 11/2015 | McMillen et al. |
| 2015/0317964 A1 | 11/2015 | McMillen et al. |
| 2015/0328492 A1 | 11/2015 | Marriott et al. |
| 2015/0330855 A1 | 11/2015 | Daniecki et al. |
| 2015/0331512 A1 | 11/2015 | McMillen et al. |
| 2015/0331522 A1 | 11/2015 | McMillen et al. |
| 2015/0331523 A1 | 11/2015 | McMillen et al. |
| 2015/0331524 A1 | 11/2015 | McMillen et al. |
| 2015/0331533 A1 | 11/2015 | McMillen et al. |
| 2015/0370396 A1 | 12/2015 | Hotelling et al. |
| 2016/0052131 A1 | 2/2016 | Lessing et al. |
| 2016/0054798 A1 | 2/2016 | Messingher et al. |
| 2016/0070347 A1 | 3/2016 | McMillen et al. |
| 2016/0073539 A1 | 3/2016 | Driscoll et al. |
| 2016/0147352 A1 | 5/2016 | Filiz et al. |
| 2016/0162022 A1 | 6/2016 | Seth |
| 2016/0169754 A1 | 6/2016 | Kowalewski et al. |
| 2016/0175186 A1 | 6/2016 | Shadduck |
| 2016/0187973 A1 | 6/2016 | Shankar et al. |
| 2016/0209441 A1 | 7/2016 | Mazzeo et al. |
| 2016/0238547 A1 | 8/2016 | Park et al. |
| 2016/0246369 A1 | 8/2016 | Osman |
| 2016/0252412 A1 | 9/2016 | McMillen et al. |
| 2016/0270727 A1 | 9/2016 | Berg et al. |
| 2016/0278709 A1 | 9/2016 | Granado et al. |
| 2016/0313798 A1 | 10/2016 | Connor |
| 2016/0318356 A1 | 11/2016 | McMillen et al. |
| 2016/0340534 A1 | 11/2016 | Wijesundara et al. |
| 2016/0375910 A1 | 12/2016 | McMillen et al. |
| 2017/0000369 A1 | 1/2017 | Hyde et al. |
| 2017/0038881 A1 | 2/2017 | McMillen |
| 2017/0056644 A1 | 3/2017 | Chahine et al. |
| 2017/0059426 A1 | 3/2017 | Choi et al. |
| 2017/0086519 A1 | 3/2017 | Vigano et al. |
| 2017/0108929 A1 | 4/2017 | Sinko et al. |
| 2017/0110103 A1 | 4/2017 | McMillen et al. |
| 2017/0127736 A1 | 5/2017 | Roberts et al. |
| 2017/0167931 A1 | 6/2017 | McMillen et al. |
| 2017/0176267 A1 | 6/2017 | Keller et al. |
| 2017/0212638 A1 | 7/2017 | McMillen |
| 2017/0215495 A1 | 8/2017 | Okumiya et al. |
| 2017/0303853 A1 | 10/2017 | McMillen et al. |
| 2017/0305301 A1 | 10/2017 | McMillen et al. |
| 2018/0015932 A1 | 1/2018 | McMillen et al. |
| 2018/0077976 A1 | 3/2018 | Keller et al. |
| 2018/0094991 A1 | 4/2018 | McMillen et al. |
| 2018/0263563 A1 | 9/2018 | McMillen et al. |
| 2019/0034019 A1 | 1/2019 | McMillen et al. |
| 2019/0219465 A1 | 7/2019 | McMillen et al. |
| 2020/0012344 A1 | 1/2020 | McMillen et al. |
| 2020/0150761 A1 | 5/2020 | Hogbin |

FOREIGN PATENT DOCUMENTS

| | | |
|---|---|---|
| CN | 102551728 A | 7/2012 |
| CN | 202396601 U | 8/2012 |
| CN | 203234132 U | 10/2013 |
| CN | 102406280 B | 3/2014 |
| DE | 102 12 023 A1 | 10/2003 |
| DE | 11 2010 004 038 T5 | 9/2012 |
| EP | 0 014 022 B1 | 11/1984 |
| EP | 0 211 984 | 3/1987 |
| EP | 2 682 724 A1 | 1/2014 |
| JP | S47-18925 | 5/1972 |
| JP | H04-011666 A | 1/1992 |
| JP | H06-323929 A | 11/1994 |
| JP | H08-071978 | 3/1996 |
| JP | H08-194481 A | 7/1996 |
| JP | H10-198503 A | 7/1998 |
| JP | 2000-267664 A | 9/2000 |
| JP | 2006-503350 | 1/2006 |
| JP | 2007-503052 A | 2/2007 |
| JP | 2008-515008 A | 5/2008 |
| JP | 2009-543030 A | 12/2009 |
| JP | 2010-503113 (A) | 1/2010 |
| JP | 2011-502313 A | 1/2011 |
| JP | 2012-521550 A | 9/2012 |
| JP | 2012-220315 A | 11/2012 |
| JP | 2014-077662 A | 5/2014 |
| JP | 2017-518338 | 12/2017 |
| KR | 10-2007-0008500 A | 1/2007 |
| KR | 100865148 B1 | 10/2008 |
| KR | 10-1362742 B1 | 2/2014 |
| KR | 10-2014-0071693 A | 6/2014 |
| NL | 8900820 A | 11/1990 |
| RU | 2 533 539 C1 | 11/2014 |
| WO | WO 99/020179 A1 | 4/1999 |
| WO | WO 2007/024875 A2 | 3/2007 |
| WO | WO 2008/032661 | 3/2008 |
| WO | WO 2009/155891 A1 | 12/2009 |
| WO | WO 2011/047171 A2 | 4/2011 |
| WO | WO 2013/116242 | 8/2013 |
| WO | WO 2013/181474 | 12/2013 |
| WO | WO 2014/058473 | 4/2014 |
| WO | WO 2015/175317 A1 | 11/2015 |
| WO | WO 2016/070078 A1 | 5/2016 |
| WO | WO 2016/138234 A1 | 9/2016 |
| WO | WO 2016/176307 A1 | 11/2016 |
| WO | WO 2016/210173 A1 | 12/2016 |
| WO | WO 2017/066096 A1 | 4/2017 |
| WO | WO 2017/184367 A1 | 10/2017 |

OTHER PUBLICATIONS

U.S. Office Action dated Apr. 15, 2013 issued in U.S. Appl. No. 12/904,657.

U.S. Notice of Allowance dated Nov. 8, 2013 issued in U.S. Appl. No. 12/904,657.

U.S. Office Action dated Mar. 12, 2015 issued in U.S. Appl. No. 14/173,617.

U.S. Notice of Allowance dated May 1, 2015 issued in U.S. Appl. No. 14/173,617.

U.S. Office Action dated Mar. 10, 2016 issued in U.S. Appl. No. 14/727,619.

U.S. Final Office Action dated Jul. 18, 2016 issued in U.S. Appl. No. 14/727,619.

U.S. Notice of Allowance dated Sep. 15, 2016 issued in U.S. Appl. No. 14/727,619.

U.S. Office Action dated Apr. 2, 2015 issued in U.S. Appl. No. 13/799,304.

U.S. Notice of Allowance dated Apr. 24, 2015 issued in U.S. Appl. No. 13/799,304.

U.S. Office Action dated Sep. 1, 2015 issued in U.S. Appl. No. 14/728,872.

U.S. Final Office Action dated Mar. 9, 2016 issued in U.S. Appl. No. 14/728,872.

U.S. Office Action dated Jun. 22, 2016 issued in U.S. Appl. No. 14/728,872.

U.S. Final Office Action dated Oct. 18, 2016 issued in U.S. Appl. No. 14/728,872.

U.S. Advisory Action dated Feb. 10, 2017 issued in U.S. Appl. No. 14/728,872.

U.S. Office Action dated May 19, 2017 issued in U.S. Appl. No. 14/728,872.

U.S. Notice of Allowance dated Oct. 16, 2017 issued in U.S. Appl. No. 14/728,872.

U.S. Office Action dated Jul. 25, 2016 issued in U.S. Appl. No. 14/728,873.

U.S. Office Action dated Dec. 30, 2016 issued in U.S. Appl. No. 14/728,873.

(56) References Cited

OTHER PUBLICATIONS

U.S. Final Office Action dated Mar. 31, 2017 issued in U.S. Appl. No. 14/728,873.
U.S. Advisory Action and Examiner initiated interview summary dated May 26, 2017 issued in U.S. Appl. No. 14/728,873.
U.S. Office Action dated Aug. 25, 2017 issued in U.S. Appl. No. 14/728,873.
U.S. Final Office Action dated Dec. 22, 2017 issued in U.S. Appl. No. 14/728,873.
U.S. Office Action dated Mar. 26, 2018 issued in U.S. Appl. No. 14/728,873.
U.S. Notice of Allowance dated Jul. 19, 2018 issued in U.S. Appl. No. 14/728,873.
U.S. Office Action dated Mar. 9, 2016 issued in U.S. Appl. No. 14/299,976.
U.S. Final Office Action dated Jul. 6, 2016 issued in U.S. Appl. No. 14/299,976.
U.S. Office Action dated Oct. 21, 2016 issued in U.S. Appl. No. 14/299,976.
U.S. Final Office Action dated Apr. 19, 2017 issued in U.S. Appl. No. 14/299,976.
U.S. Final Office Action dated Jun. 8, 2017 issued in U.S. Appl. No. 14/299,976.
U.S. Office Action dated Sep. 1, 2017 issued in U.S. Appl. No. 14/299,976.
U.S. Notice of Allowance dated Feb. 22, 2018 issued in U.S. Appl. No. 14/299,976.
U.S. Office Action dated Jan. 13, 2016 issued in U.S. Appl. No. 14/464,551.
U.S. Notice of Allowance dated Jun. 23, 2016 issued in U.S. Appl. No. 14/464,551.
U.S. Office Action dated Sep. 23, 2016 issued in U.S. Appl. No. 14/800,538.
U.S. Notice of Allowance dated Jan. 17, 2017 issued in U.S. Appl. No. 14/800,538.
U.S. Office Action dated Jul. 12, 2018 issued in U.S. Appl. No. 15/483,926.
U.S. Office Action dated Feb. 22, 2017 issued in U.S. Appl. No. 14/671,821.
U.S. Notice of Allowance dated Jul. 3, 2017 issued in U.S. Appl. No. 14/671,821.
U.S. Office Action dated Jun. 30, 2017 issued in U.S. Appl. No. 15/251,772.
U.S. Final Office Action dated Nov. 15, 2017 issued in U.S. Appl. No. 15/251,772.
U.S. Office Action dated Feb. 22, 2018 issued in U.S. Appl. No. 15/251,772.
U.S. Office Action dated Sep. 4, 2018 issued in U.S. Appl. No. 15/251,772.
U.S. Office Action dated Jun. 28, 2016 issued in U.S. Appl. No. 14/671,844.
U.S. Final Office Action dated Nov. 25, 2016 issued in U.S. Appl. No. 14/671,844.
U.S.Notice of Allowance dated Mar. 13, 2017 issued in U.S. Appl. No. 14/671,844.
U.S. Office Action dated Jan. 26, 2017 issued in U.S. Appl. No. 15/052,293.
U.S. Final Office Action dated May 2, 2017 issued in U.S. Appl. No. 15/052,293.
U.S. Notice of Allowance dated May 24, 2017 issued in U.S. Appl. No. 15/052,293.
U.S. Notice of Allowance [Supplemental Notice of Allowability] dated Jun. 20, 2017 issued in U.S. Appl. No. 15/052,293.
U.S. Notice of Allowance dated Sep. 22, 2017 issued in U.S. Appl. No. 15/052,293.
U.S. Notice of Allowance [Supplemental Notice of Allowability] dated Oct. 19, 2017 issued in U.S. Appl. No. 15/052,293.
U.S. Office Action dated Jul. 24, 2018 issued in U.S. Appl. No. 15/835,131.
U.S. Office Action dated May 20, 2016 issued in U.S. Appl. No. 14/928,058.
U.S. Final Office Action dated Jan. 6, 2017 issued in U.S. Appl. No. 14/928,058.
U.S. Notice of Allowance dated Mar. 16, 2017 issued in U.S. Appl. No. 14/928,058.
U.S. Office Action dated Aug. 14, 2018 issued in U.S. Appl. No. 15/621,935.
U.S. Office Action dated Nov. 3, 2017 issued in U.S. Appl. No. 15/138,802.
U.S. Final Office Action dated Mar. 1, 2018 issued in U.S. Appl. No. 15/138,802.
U.S. Advisory Action dated May 16, 2018 issued in U.S. Appl. No. 15/138,802.
U.S. Notice of Allowance dated Jul. 3, 2018 issued in U.S. Appl. No. 15/138,802.
U.S. Office Action dated Jun. 23, 2017 issued in U.S. Appl. No. 15/190,089.
U.S. Notice of Allowance dated Aug. 10, 2017 issued in U.S. Appl. No. 15/190,089.
U.S. Office Action dated Dec. 27, 2016 issued in U.S. Appl. No. 15/287,520.
U.S. Notice of Allowance dated Mar. 27, 2017 issued in U.S. Appl. No. 15/287,520.
PCT International Search Report dated May 27, 2011, issued in PCT/US2010/052701.
PCT International Preliminary Report on Patentability and Written Opinion dated Apr. 26, 2012, issued in PCT/US2010/052701.
Japanese Office Action dated Feb. 25, 2014 issued in JP 2012-534361.
PCT International Search Report and Written Opinion dated Sep. 3, 2015 issued in PCT/US2015/029732.
PCT International Preliminary Report on Patentability and Written Opinion dated Nov. 24, 2016 issued in PCT/US2015/029732.
PCT International Search Report and Written Opinion dated May 26, 2016 issued in PCT/US2016/019513.
PCT International Preliminary Report on Patentability and Written Opinion dated Sep. 8, 2017 issued in PCT/US2016/019513.
PCT International Search Report and Written Opinion dated Apr. 14, 2016 issued in PCT/US2015/058370.
PCT International Preliminary Report on Patentability and Written Opinion dated May 11, 2017 issued in PCT/US2015/058370.
PCT International Search Report and Written Opinion dated Sep. 15, 2016 issued in PCT/US2016/029528.
PCT International Preliminary Report on Patentability and Written Opinion dated Oct. 31, 2017 issued in PCT/US2016/029528.
PCT International Search Report and Written Opinion dated Sep. 29, 2016 issued in PCT/US2016/039089.
PCT International Preliminary Report on Patentability and Written Opinion dated Dec. 26, 2017 issued in PCT/US2016/039089.
PCT International Search Report and Written Opinion dated Jan. 19, 2017 issued in PCT/US2016/055997.
PCT International Preliminary Report on Patentability and Written Opinion dated Apr. 26, 2018 issued in PCT/US2016/055997.
PCT International Search Report and Written Opinion dated Aug. 14, 2017 issued in PCT/US2017/026812.
"Electronic Foot Size Measuring Devices," *Sensatech Research LTD., Custom Electronic Sensing Solutions*, Registered Office: 4 Heath Square, Boltro Road, Haywards Heath, RH16 1BL Company Registration No. 4524018 Cardiff [retrieved at http:www.electronicsarena.co.uk/companies/sensatech-research/products/electronic-foot-size-measureing-devices on Sep. 17, 2015], 3 pages.
"IStep® Digital Foot Scan," (© 2002-2015) [retrieved at http://www.foot.com/site/iStep on Sep. 17, 2015], 1 page.
"Podotech Elftman," and Podotech Elftman Brochure (UK Version) [retrieved at http://www.podotech.com/diagnostics/podotech-elftman-2/ on Sep. 17, 2015] podo+tech®, Foot Care Technology Solutions, 7 pages.
Roh, Jung-Sim et al. (2011) "Robust and reliable fabric and piezoresistive multitouch sensing surfaces for musical controllers," from Alexander Refsum Jensenius, Recorded at: *11th International Con-*

(56) References Cited

OTHER PUBLICATIONS

*ference on New Interfaces for Musical Expression* May 30-Jun. 1, 2011, Oslo, Norway, a vimeo download at http://vimeo.com/26906580.

"The Emed®-Systems," [retrieved at http://www.novel.de/novelcontent/emed on Sep. 17, 2015] novel.de, 4 pages.

U.S. Appl. No. 15/630,840, filed Jun. 22, 2017, McMillen et al.

U.S. Notice of Allowance dated Dec. 31, 2018 issued in U.S. Appl. No. 15/483,926.

U.S. Final Office Action dated Dec. 21, 2018 issued in U.S. Appl. No. 15/251,772.

U.S. Notice of Allowance dated Mar. 5, 2019 issued in U.S. Appl. No. 15/251,772.

U.S. Notice of Allowance dated Dec. 4, 2018 issued in U.S. Appl. No. 15/835,131.

U.S. Office Action dated Mar. 6, 2019 issued in U.S. Appl. No. 15/835,131.

U.S. Notice of Allowance dated May 13, 2019 issued in U.S. Appl. No. 15/835,131.

U.S. Final Office Action dated Feb. 14, 2019 issued in U.S. Appl. No. 15/621,935.

U.S. Notice of Allowance dated May 22, 2019 issued in U.S. Appl. No. 15/621,935.

U.S. Supplemental Notice of Allowance dated Jun. 13, 2019 issued in U.S. Appl. No. 15/621,935.

U.S. Office Action dated Oct. 21, 2019 issued in U.S. Appl. No. 15/621,935.

U.S. Office Action dated Dec. 13, 2018 issued in U.S. Appl. No. 15/690,108.

U.S. Office Action dated Jul. 5, 2019 issued in U.S. Appl. No. 15/690,108.

U.S. Notice of Allowance dated Jan. 29, 2020 issued in U.S. Appl. No. 15/690,108.

U.S. Office Action dated May 24, 2019 issued in U.S. Appl. No. 15/479,103.

U.S. Final Office Action dated Sep. 20, 2019 issued in U.S. Appl. No. 15/479,103.

Japanese Office Action dated Dec. 4, 2018 issued in JP 2016-566814.

Japanese Office Action dated Jul. 30, 2019 issued in JP 2017-518338.

Japanese Office Action dated Jul. 9, 2019 issued in JP 2018-114012.

PCT International Search Report and Written Opinion dated Nov. 8, 2018 issued in PCT/US2018/035848.

PCT International Preliminary Report on Patentability and Written Opinion dated Dec. 26, 2019 issued in PCT/US2018/035848.

PCT International Preliminary Report on Patentability dated Nov. 1, 2018 issued in PCT/US2017/026812.

U.S. Appl. No. 16/692,626, filed Nov. 22, 2019, Lacy et al.

U.S. Appl. No. 16/806,297, filed Mar. 2, 2020, McMillen.

U.S. Office Action dated Dec. 31, 2018 issued in U.S. Appl. No. 15/374,816.

U.S. Notice of Allowance dated Mar. 11, 2019 issued in U.S. Appl. No. 15/374,816.

U.S. Office Action dated Jan. 10, 2020 issued in U.S. Appl. No. 16/362,017.

U.S. Notice of Allowance dated May 13, 2020 issued in U.S. Appl. No. 16/362,017.

U.S. Final Office Action dated Apr. 28, 2020 issued in U.S. Appl. No. 15/621,935.

U.S. Office Action dated May 28, 2020 issued in U.S. Appl. No. 16/449,017.

Japanese Office Action dated May 22, 2020 issued in JP 2017-518338.

\* cited by examiner

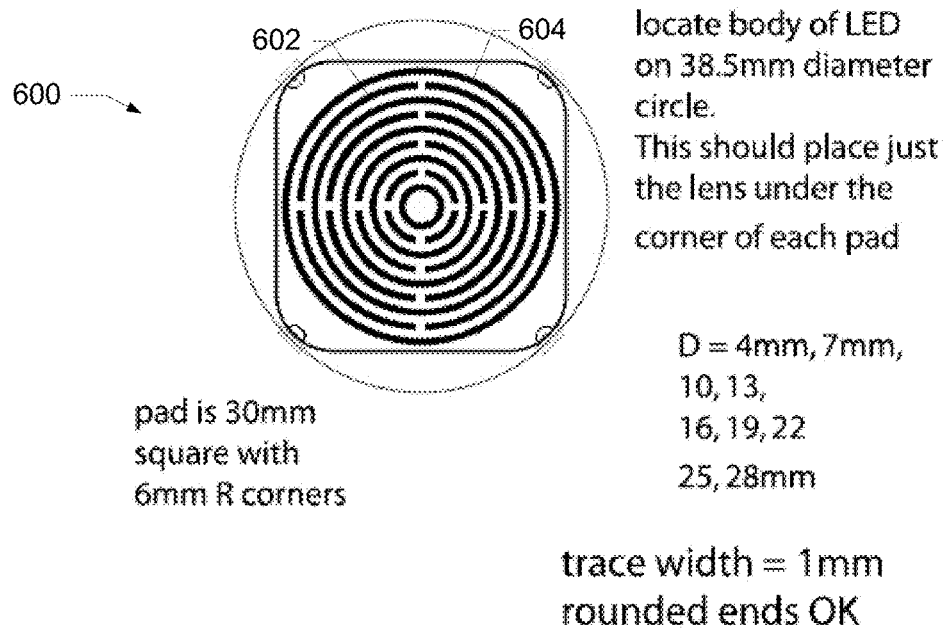

locate body of LED on 38.5mm diameter circle.
This should place just the lens under the corner of each pad pad is 30mm square with 6mm R corners D = 4mm, 7mm, 10, 13, 16, 19, 22, 25, 28mm trace width = 1mm
rounded ends OK

FIG. 6

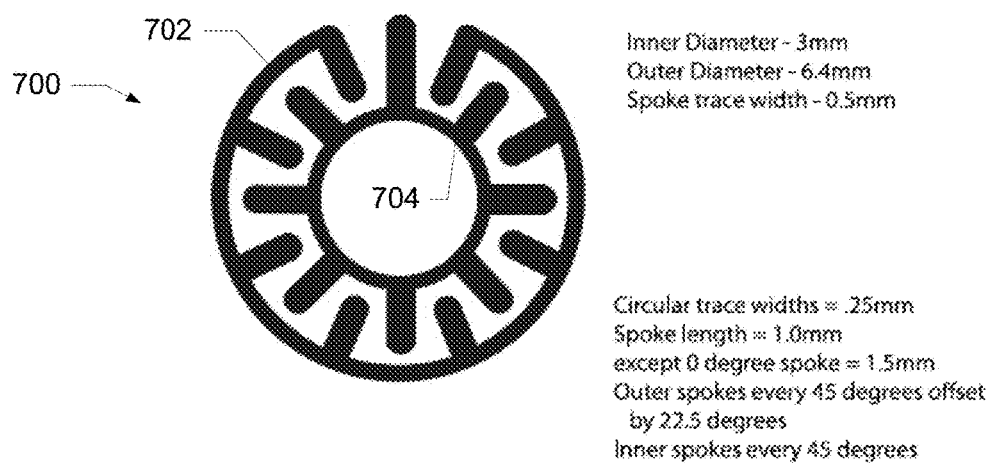

Inner Diameter - 3mm
Outer Diameter - 6.4mm
Spoke trace width - 0.5mm

Circular trace widths = .25mm
Spoke length = 1.0mm
except 0 degree spoke = 1.5mm
Outer spokes every 45 degrees offset by 22.5 degrees
Inner spokes every 45 degrees

FIG. 7

PIEZORESISTIVE SENSORS AND APPLICATIONS

RELATED APPLICATION DATA

The present application is a continuation of and claims priority under 35 U.S.C. 120 to U.S. patent application Ser. No. 14/728,873 for Multi-Pad Touch Controller filed on Jun. 2, 2015, which is a continuation of and claims priority under 35 U.S.C. 120 to U.S. patent application Ser. No. 13/799,304 for Multi-Touch Pad Controller filed on Mar. 13, 2013, which claims priority under 35 U.S.C. 119(e) to U.S. Provisional Patent Application No. 61/610,924 for QuNeo 3D Multitouch Pad Controller filed on Mar. 14, 2012, the entire disclosure of each of which is incorporated herein by reference for all purposes.

BACKGROUND

There are a number of controllers used by musicians for triggering drum sounds, manipulating rhythmic beats, adjusting parameters and launching sample-based clips. Minimal user feedback is provided requiring the musician to look at a computer screen for information of the state of the sound producing software. Available controller devices have limited utility and are usually targeted at a specific type of data manipulation or work only with specific software. Typically these devices have used simple switches, variable knobs or slide potentiometers and trigger pads. These limitations require users to have multiple pieces of gear that produce a limited amount of control.

SUMMARY

According to a first class of implementations, a controller is provided that includes N control pads and one or more processors, where N is an integer greater than zero. Each control pad has sensor circuitry associated therewith configured to generate one or more sensor signals representing corresponding touch events on a corresponding surface of the control pad. The one or more sensor signals associated with each control pad also represent corresponding locations of the touch events on the surface of the control pad. The one or more processors are configured to generate control information from the sensor signals. In a first operational mode the one or more processors are configured to map the control information to N control functions. In a second operational mode the one or more processors are configured to map the control information to N×M control functions corresponding to the locations of the touch events on the surfaces of the N control pads, where M is an integer greater than one.

According to one such implementation, N is 16 and M is 4. The N control pads are arranged in a 4×4 array, and the locations of the touch events on the surfaces of the N control pads corresponding to the N×M control functions form an 8×8 control array. According to another such implementation, the first mode of operation corresponds to a drum pad controller, and the second mode of operation corresponds to a grid controller. According to another such implementation, the one or more sensor signals associated with each control pad also represent pressure of the touch events on the surface of the control pad, and the pressure of the touch events is reflected in the control information.

According to yet another such implementation, the sensor circuitry associated with each control pad includes four sensor quadrants. Each sensor quadrant includes first conductive elements connected to a first voltage reference and second conductive elements connected to a second voltage reference. At least some of the first and second conductive elements are connected to the corresponding voltage reference via a resistive element. The sensor circuitry also includes a conductive material configured to make contact with at least some of the first and second conductive elements in at least some of the sensor quadrants in response to the touch events, thereby forming one or more voltage dividers corresponding to the sensor quadrants with which contact is made. According to a specific implementation, the conductive material or at least some of the first and second conductive elements are or include a piezoresistive material. According to another specific implementation, the first and second conductive elements are arranged as concentric conductive traces across the four sensor quadrants, at least some of the concentric conductive traces being discontinuous, thereby defining the four sensor quadrants.

According to another class of implementations, a sensor is configured to generate one or more sensor signals representing corresponding touch events on a corresponding surface associated with the sensor. The sensor includes sensor circuitry that includes four sensor quadrants. Each sensor quadrant includes first conductive elements connected to a first voltage reference and second conductive elements connected to a second voltage reference. At least some of the first and second conductive elements are connected to the corresponding voltage reference via a resistive element. The sensor circuitry also includes a conductive material configured to make contact with at least some of the first and second conductive elements in at least some of the sensor quadrants in response to the touch events, thereby forming one or more voltage dividers corresponding to the sensor quadrants with which contact is made.

According to one such implementation, the conductive material or at least some of the first and second conductive elements are or include a piezoresistive material. According to another such implementation, the first and second conductive elements are arranged as concentric conductive traces across the four sensor quadrants. At least some of the concentric conductive traces are discontinuous, thereby defining the four sensor quadrants.

According to another such implementation, the one or more sensor signals represent pressure of the touch events on the surface of the sensor.

According to yet another such implementation, the one or more sensor signals represent corresponding locations of the touch events on the surface of the sensor. According to a more specific implementation, the touch events correspond to an object in contact with the surface of the sensor, and the one or more sensor signals also represent movement of the object across the surface of the sensor. According to an even more specific implementation, the one or more sensor signals also represent pressure of the touch events on the surface of the sensor, and the one or more sensor signals also represent wiggling of the object on the surface of the sensor.

According to another class of implementations, a sensor is configured to generate one or more sensor signals representing corresponding touch events on a corresponding surface associated with the sensor. The sensor comprising sensor circuitry that includes an arrangement of conductive elements. First one of the conductive elements are connected to a voltage reference, and second ones of the conductive elements are configured to receive sequential drive signals. At least some of the first and second conductive elements are connected to a resistive element. The sensor circuitry also includes a conductive material configured to make contact with at least some of the first and second conductive elements at locations associated with the touch events, thereby forming one or more voltage dividers when the second conductive elements with which contact by the conductive material is made are driven by a corresponding one of the sequential drive signals.

According to one such implementation, the conductive material or at least some of the first and second conductive elements are or include a piezoresistive material.

According to another such implementation, the one or more sensor signals represent corresponding locations of the touch events on the surface of the sensor. According to a more specific implementation, the one or more sensor signals represent the corresponding locations of multiple and simultaneous ones of the touch events on the surface of the sensor. According to another specific implementation, the touch events correspond to an object in contact with the surface of the sensor, and the one or more sensor signals also represent movement of the object across the surface of the sensor. According to an even more specific implementation, the one or more sensor signals also represent pressure of the touch events on the surface of the sensor, and wherein the one or more sensor signals also represent wiggling of the object on the surface of the sensor.

According to another such implementation, the one or more sensor signals represent pressure of the touch events on the surface of the sensor. According to a more specific implementation, the one or more sensor signals also represent corresponding locations of multiple and simultaneous ones of the touch events on the surface of the sensor.

According to yet another such implementation, the arrangement of the first and second conductive elements is an alternating arrangement of the first and second conductive elements. According to a more specific implementation, the alternating arrangement of the first and second conductive elements is either linear, circular, or rectilinear.

According to yet another such implementation, a control system includes at least one instance of the sensor, and one or more processors configured drive the second conductive elements with the sequential drive signals, to generate control information from the one or more sensor signals, and to map the control information to one or more control functions. According to a more specific implementation, the one or more sensor signals represent pressure of the touch events on the surface of the sensor, and a first one of the touch events corresponds to the conductive material making contact with more than one pair of the first and second conductive elements. The one or more processors are configured to generate the control information to represent a first location of the first touch event as corresponding to one of the pairs of the first and second conductive element with reference to the representation of the pressure of the first touch event in the one or more sensor signals. According to another specific implementation, the one or more sensor signals represent pressure of the touch events on the surface of the sensor, and the one or more sensor signals also represent corresponding locations of multiple and simultaneous ones of the touch events on the surface of the sensor. The one or more processors are configured to generate the control information to represent the pressure associated with each of the simultaneous touch events. According to another specific implementation, the one or more sensor signals represent corresponding locations and pressure of the touch events on the surface of the sensor, and the one or more processors are configured to map the control information to multiple control functions corresponding to different gestures. According to yet another specific implementation, the first and second conductive elements are each wedge-shaped and the arrangement of the first and second conductive elements is an alternating circular arrangement of the first and second conductive elements. The one or more processors are configured to generate the control information to represent a distance from a center of the circular arrangement based on a number of the conductive elements represented in the one or more sensor signals.

According to yet another class of implementations, computer program products and computer-implemented methods are provided for configuring a music controller to operate with one or more of a plurality of music applications from a plurality of different vendors. The plurality of music applications are presented as selectable options in a user interface of a computing device. One or more selections of the music applications are received. A location in memory of the computing device is identified for each selected music application. A plurality of script code files is stored in each location. Each script code file maps control information generated by the music controller to functions of the selected music application for the corresponding location. Each selected music application is configured to perform the functions in response to the control information from the controller using the script code files stored in the corresponding location in the memory of the computing device.

According to one such implementation, copies of the script code files are stored in one or more directories in the memory of the computing device separate from the locations for each of the selected music applications.

According to another such implementation, an example file for each selected music application is stored in the memory of the computing device. Each example file including code representing one or more sounds that may be generated using the corresponding selected music application in conjunction with the controller.

BRIEF DESCRIPTION OF THE DRAWINGS

FIG. 6-9 are diagrams of further implementations of sensors.

A further understanding of the nature and advantages of various implementations may be realized by reference to the remaining portions of the specification and the drawings.

DETAILED DESCRIPTION

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Various implementations provide a highly configurable controller that includes a number of different types of control mechanisms that emulate a wide variety of conventional control mechanisms (e.g., buttons, sliders, pads, rotary controls, etc.) using pressure and location sensitive sensors that generate high-density control information which may be mapped to the controls of a wide variety of devices and software.

Figure 1:
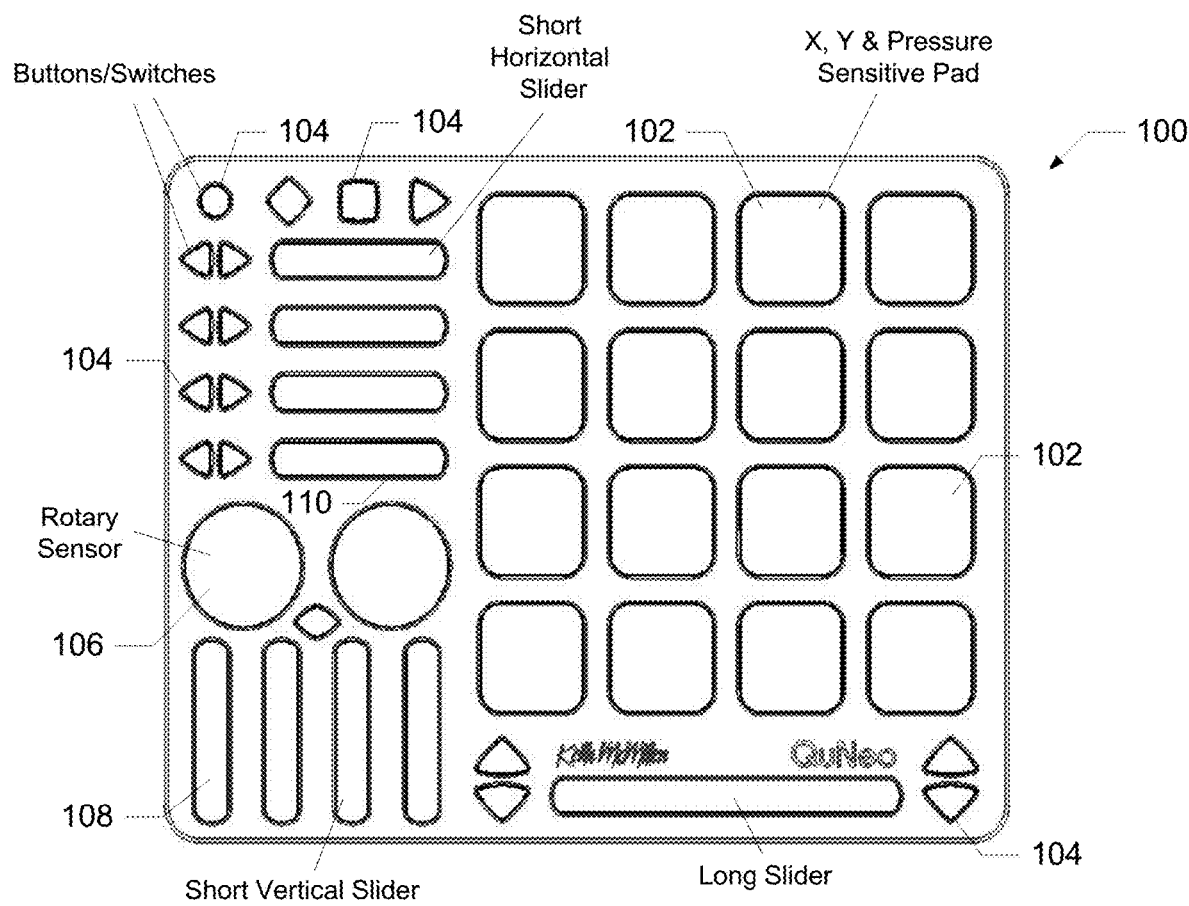
FIG. 1 is a top view of a particular implementation of a controller.

A particular implementation shown in FIG. 1 is embodied as a musical effects controller 100 and is referred to herein as QuNeo. QuNeo 100 provides a variety of sensors, at least some of which are responsive to X and Y (position) and Z (pressure), by which a user effects control over connected software or device(s). The depicted implementation includes pressure and position sensitive pads 102, buttons/switches 104, decks or rotary sensors 106 (e.g., to emulate spinning vinyl records), faders or sliders 108 or 110 (e.g., to emulate VU or loudness metering). Any of sensors 104, 106, 108 and 110 may also be sensitive to pressure. As will be discussed, each of the depicted sensors generates control information that may be mapped to control a wide variety of software and/or devices.

According to some implementations, pressure and position sensitive pads 102 can be used to elicit percussive sounds that vary in timbre based on where the user strikes the pad which is analogous to real acoustic percussion instruments. Faders 108 are analogous to volume level controls on traditional mixing boards. Buttons 104 can be used to make selections from lists presented by a computer menu and can scroll or navigate more rapidly through the list based on how firmly the button is pushed. A wide variety of other applications of the sensor capabilities and high density control information generated by controllers as implemented herein will be apparent to those of skill in the art.

Figure 2:
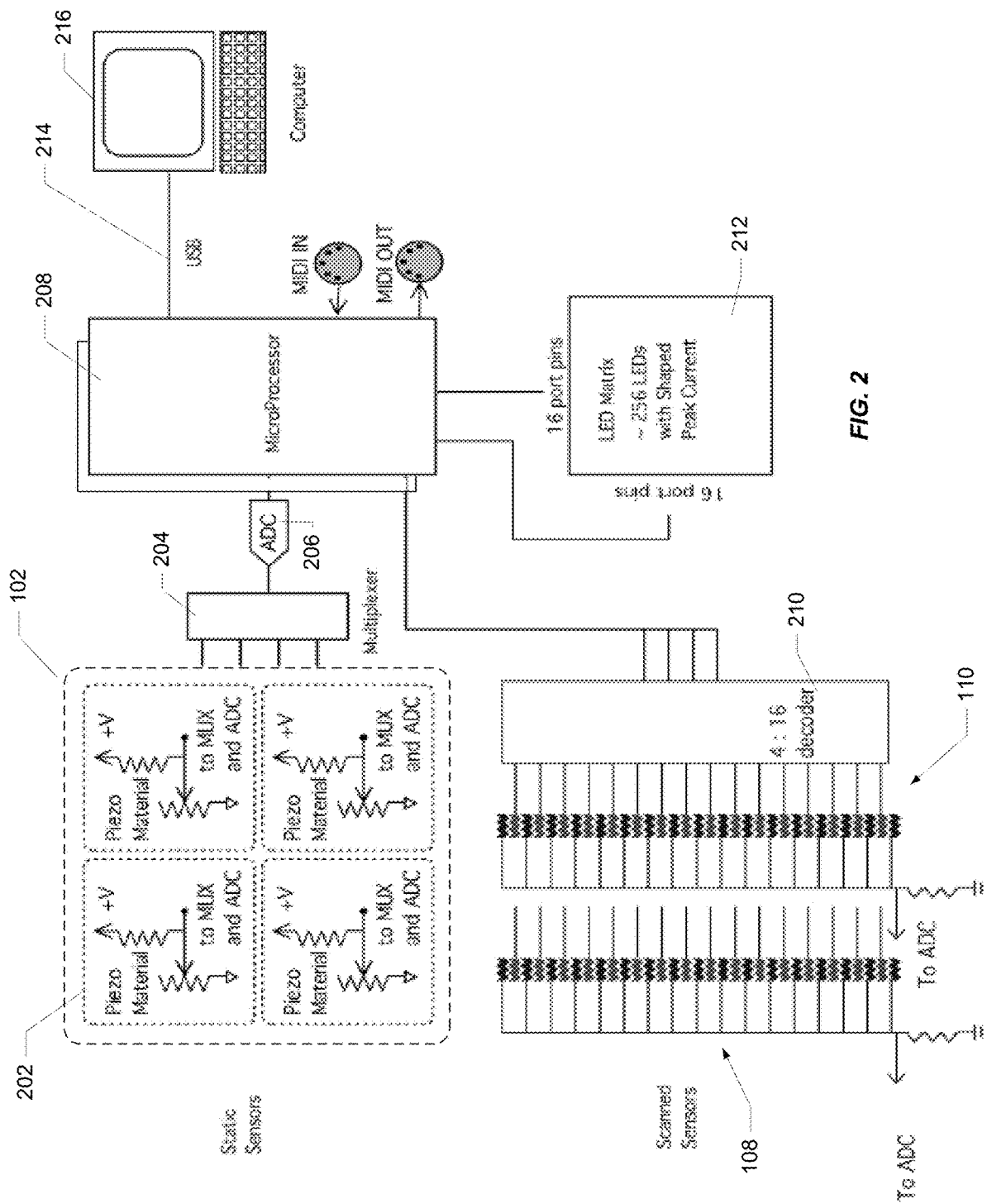
FIG. 2 is a simplified block diagram of a particular implementation of a controller.

FIG. 2 shows a simplified block diagram of the components of a controller such as, for example, QuNeo 100. In this diagram only some of the sensors are depicted for the sake of clarity. Pad 102 is shown to include four voltage dividers 202 implemented with piezoresistive material, each of which generates an output signal responsive to pressure exerted on pad 102 that is reflective of the changing characteristics of the respective voltage dividers. The signals are multiplexed (204) and converted to digital form (206) and then provided as input to one or more microprocessors 208.

Sliders 108 and 110, the operation of which is described below, are scanned or driven by microprocessor 208 via decoders, e.g., decoder 210 (only one of which is shown for clarity). The outputs of sliders 108 and 110 are then converted to digital form (not shown) for input to microprocessor 208. Other sensors, e.g., buttons 106 shown in FIG. 1, provide input to microprocessor 208 by similar connections. In this implementation, microprocessor 208 also controls an LED matrix 212 that underlies the translucent surfaces of the various sensors. A particular drive scheme for such an LED matrix is described below. Optional MIDI (Musical Instrument Digital Interface) input and MIDI output are provided by which microprocessor 208 may communicate with and control various MIDI-compliant devices. Control information generated from the various sensors may also be provided over a serial link (e.g., USB link 214) for the control of software (e.g., on computing device 216) or a connected device (not shown). The functionalities of QuNeo 100 may also be configured, programmed, or modified via USB link 214 by software residing on computing device 216. Alternatively, USB link 214 may be replaced by any suitable alternative including, for example, a wireless connection. Computing device 216 may be any of a wide variety of computing devices including, for example, a personal computer (e.g., a laptop or desktop), a mobile device (e.g., a cell phone, smart phone, or tablet), a set top box (e.g., for cable or satellite systems), a smart television, a gaming console, etc.

Figure 3:
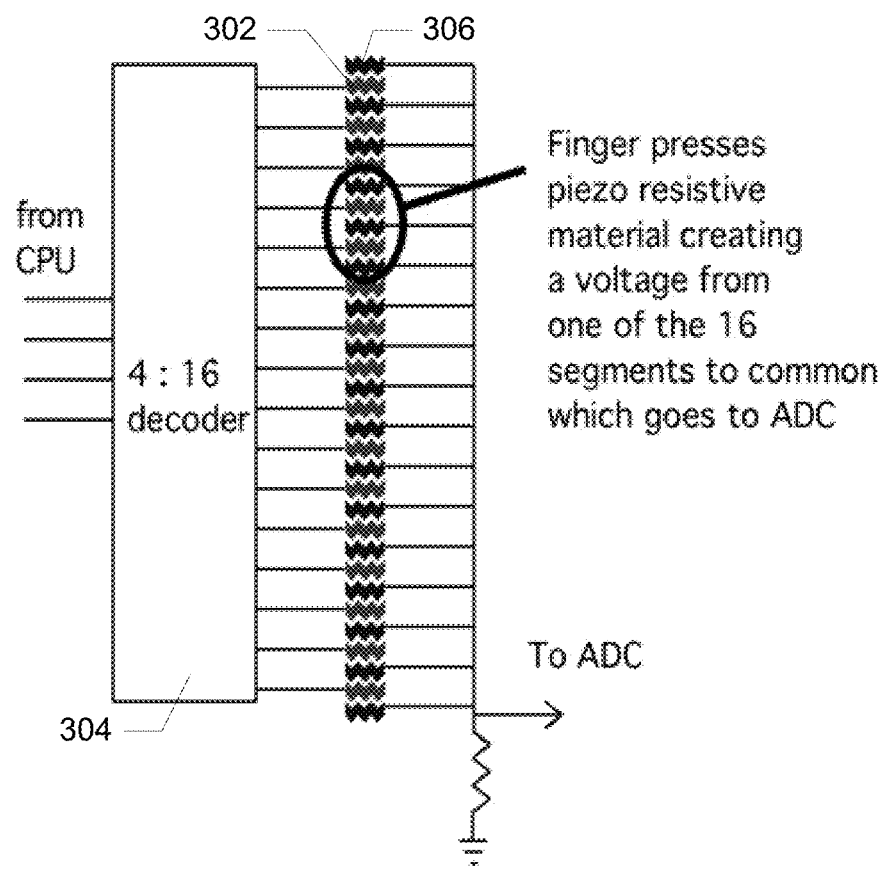
FIG. 3 is a diagram of a particular implementation of a sensor.

According to a particular class of implementations, a subset of the sensors (e.g., the sliders and rotary sensors) are implemented using an array of driven or scanned conductive printed circuit board (PCB) elements alternating with conductive elements connected to a voltage reference, e.g., ground, through a resistor. The array overlaid with a conductive pressure sensitive compressible material that may be a piezoresistive material such as, for example, germanium, polycrystalline silicon, amorphous silicon, non-woven impregnated fabric and single crystal silicon. FIG. 3 shows a configuration of a such a sensor in which the conductive elements are arranged in a linear array to form a slider. The microprocessor (not shown) sequentially selects and activates the driven elements (16 elements 302 are used in a particular implementation) via decoder 304 by raising its voltage to a known level (e.g., 3.3V). The other driven elements 302 are set to ground or 0 volts.

Figure 4A:
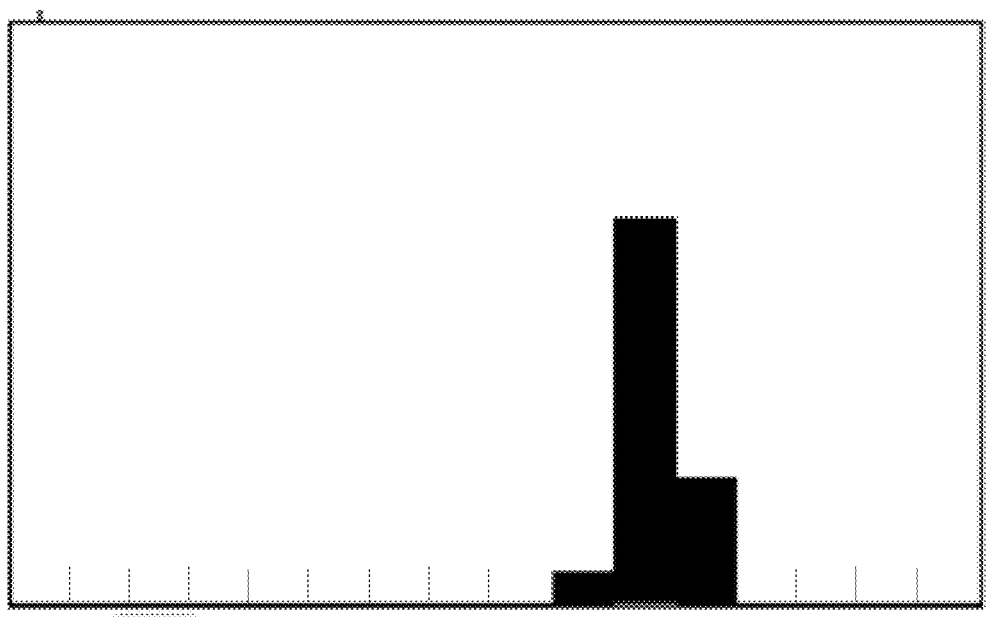
FIGS. 4A and 4B are bar graphs representing touch events on the sensor of FIG. 3.

The common elements 306 are tied to ground through a resistor. When pressure is applied by the user (e.g., using a finger or stylus) the driven element(s) 302 at the point of contact are connected to the surrounding common elements 306 by the overlying conductive material (not shown). The voltage at the junction of the common elements and the driven element(s) is thereby raised and transmitted via a multiplexer to an ADC (not shown). The microprocessor driving the driven elements (not shown) also sequentially measures the corresponding signal levels, e.g., the voltage at the junction of the driven element(s) and nearby common element(s), to determine whether and where a touch event occurs. The ADC output can be represented as shown in the bar graph of FIG. 4A in which the ADC output from the 16 driven elements is represented as bars along the horizontal axis.

According to implementations in which the overlying material that connects the sensor resistive elements is a piezoresistive material, processing of this data by the microprocessor yields both pressure information (e.g., the sum of all raised data points) and location information (e.g., the centroid of the data points). According to a particular class of implementations, the positional resolution derived from the array may be much greater than the number of elements, i.e., interpolation between the data values using a centroid calculation or similar method yields greater positional accuracy than simply using the locations of the array elements. For example, if the ADC converter that measures the voltages of 16 driven elements is 8 bits the positional resolution is theoretically 1 part in 256 for each of the 16 element locations, or 1 part in 4096 for the array using a simple interpolation approach.

Figure 4B:

According to some implementations, driven/scanned sensors can be configured to recognize multiple touch points. The graph of FIG. 4B illustrates ADC values for three fingers exerting pressure on the linear array of elements at different locations. Height and number of element voltage values map directly to the pressure applied. In such configurations, user interface gestures such as pinch and stretch and multiple finger swipes can be extracted from the sensor array along with pressure for each of the contact points.

Various configurations of resistive elements are contemplated that yield information about different styles of human gesture. For example, if the elements are arranged in a linear array as shown in FIG. 3 a slider may be implemented. If the elements are arranged in a two-dimensional array (e.g., a circular or rectilinear array) information about motion in two-dimensions, e.g., rotary motion, can be extracted.

Figure 5A:
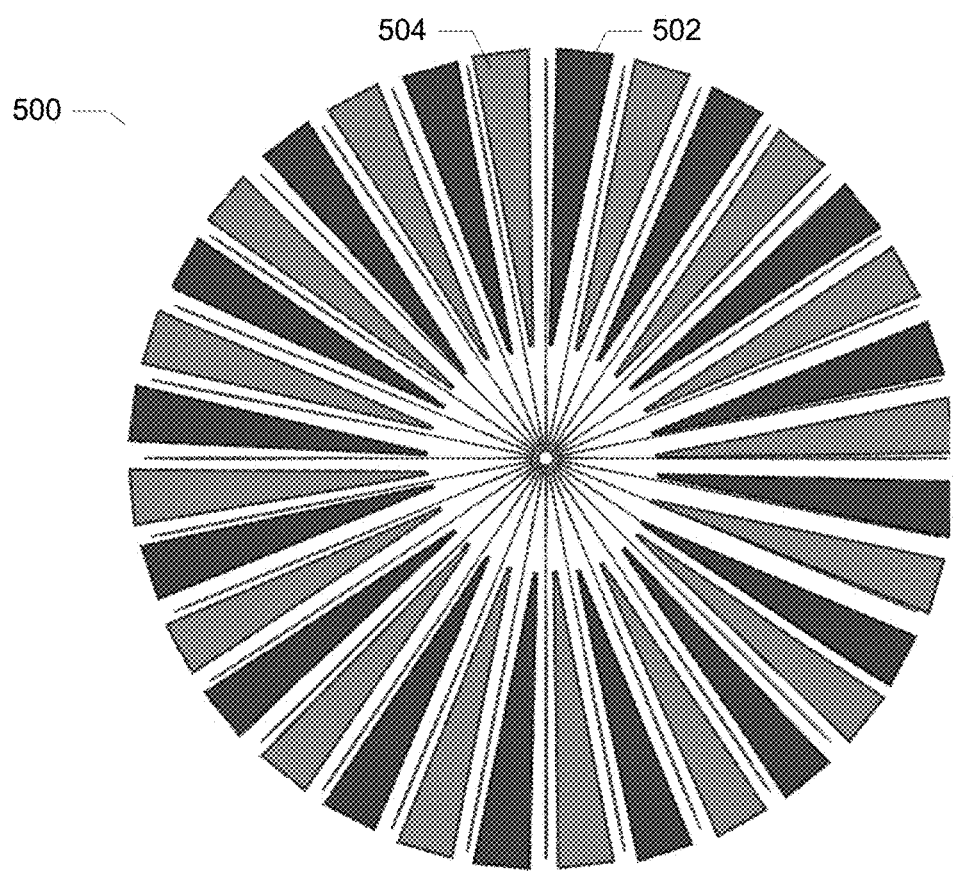
FIG. 5A is a diagram of another implementation of a sensor.

FIG. 5A shows an example of a two-dimensional array 500 of PCB conductive elements arranged in a circular pattern. In the depicted implementation, sixteen driven elements alternate with sixteen common elements. Apart from the shape and configuration of the conductive elements, the principle of operation of a sensor using array 500 is similar to the sensor described above with reference to FIG. 3, with the circuitry for driving and measuring signal levels (not shown) being substantially the same. As with the sensor of FIG. 3, each of the driven elements can be driven to an active voltage while the common elements are tied together and biased to a reference, e.g., ground, through a resistor. The entire circular area is covered with a compressible conductive and/or piezoresistive material. As the microprocessor reads the ADC values for each of the 16 driven elements, high-resolution rotational or angular position along with the pressure of the activating finger or object may be determined using, for example, interpolation techniques as mentioned above.

Figure 5B:
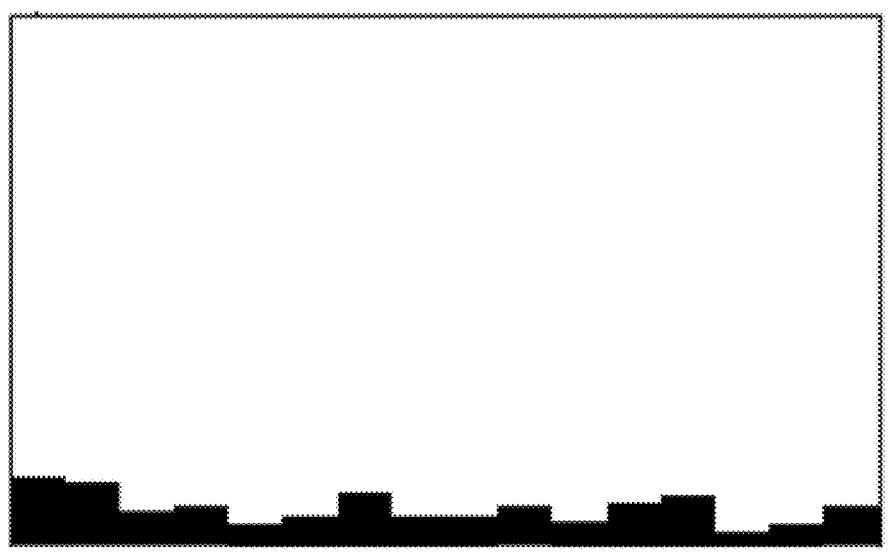
FIG. 5B is a bar graph representing a touch event on the sensor of FIG. 5A.

Analyzing the spread of data values using known statistical methods may provide information related to the location of the touch event with respect to the center of circular array 500. This can be expressed as the radius of the gesturing finger. According to a particular implementation, the radial "slices" converge in the center of the array to a radius approximating the size of the activating source, e.g., such as 4-5 mm for a human finger. In the bar graph of FIG. 5B, the ADC output for all of the driven elements shows some voltage associated with their activation. As these approach an equal amount from all radial elements the microprocessor can determine that the finger is in the center of the circular array. In addition, for implementations in which the overlying material is piezoresistive, the summed height or voltage of all elements is substantially proportional to pressure.

Another sensor that may be used with various implementations of a controller as described herein is illustrated in FIG. 6. In this implementation, a piezoresistive material (not shown) overlies an array 600 of concentric conductive traces, a subset of which are discontinuous and divided into four quadrants. As will be discussed, this arrangement is configured to provide both positional information (e.g., X and Y or in the plane of the page), as well as pressure information (e.g., Z or into the page) regarding a touch event. This arrangement of conductive traces may be used to implement, for example, sensor pads 102 shown in FIGS. 1 and 2.

Each of four quadrants of 90 degrees includes discontinuous conductive traces 602 spanning about 90 degrees of arc that are connected to each other and tied to a reference voltage through a resistor (e.g., 10K ohm) and to an ADC through a multiplexer (e.g., as shown in FIG. 2). Alternating with the discontinuous quadrant traces in the radial direction are continuous concentric traces 604 that are at some reference, e.g., ground or 0 Volts. The pattern of traces is covered with a compressible piezoresistive material (not shown).

As the user presses on a silicone pad that covers the piezo-resistive material, the conductive trace of the four quadrants are connected to the reference voltage (via the piezoresistive material) to varying degrees. The location chosen by the user and the pressure exerted in that position can be determined by a microprocessor (e.g., 208) through a comparison and evaluation of the signal levels present in each of the quadrants. As will be understood, this arrangement can provide a very high density of control information that may be mapped to a wide variety of applications. For example, in addition to the control of musical effects, the control information generated using such a sensor may be used to control a cursor or pointer, or the depicted point of view, in the user interface of a computing device. In addition, as discussed below, this arrangement may also be flexibly configured to operate as a single sensor or as multiple sensors.

FIG. 7 shows an arrangement of conductive PCB traces for implementing another type of sensor that allows measurement of pressure at a specific point. Using this configuration, even simple switches, e.g., "On/Off" buttons, may be made pressure sensitive by use of a pattern of traces 700 covered with the piezoresistive material (not shown). One of traces 702 and 704 is pulled up to a reference while the other pull down to another reference. As the user's finger pressure compresses the piezoresistive material the resistance between the conductors 702 and 704 decreases and the voltage to the ADC changes correspondingly. Applications of such a sensor include, for example, pressure controlled scrolling rates when doing selection of items in a user interface, or pressure-sensitive control of musical parameters.

According to various implementations, the geometry, density, opacity and coating of an silicone layer overlying the sensors may be controlled to accomplish any subset of the following: (1) hold the piezoresistive material at a specified distance from the trace patterns; (2) deform evenly over the length, diameter or area of the specific sensor providing a linear and even response; (3) transfer the luminance from an LED indicator over the top of the sensor area; (4) diffuse the LED indicator light so it does not appear as a point; (5) protect the piezoresistive material, LED, trace and/or electronic components underneath; and/or (6) provide an appropriate tactile surface so the finger can slide or grip in a manner appropriate for how the specific sensor is activated.

Figure 8:
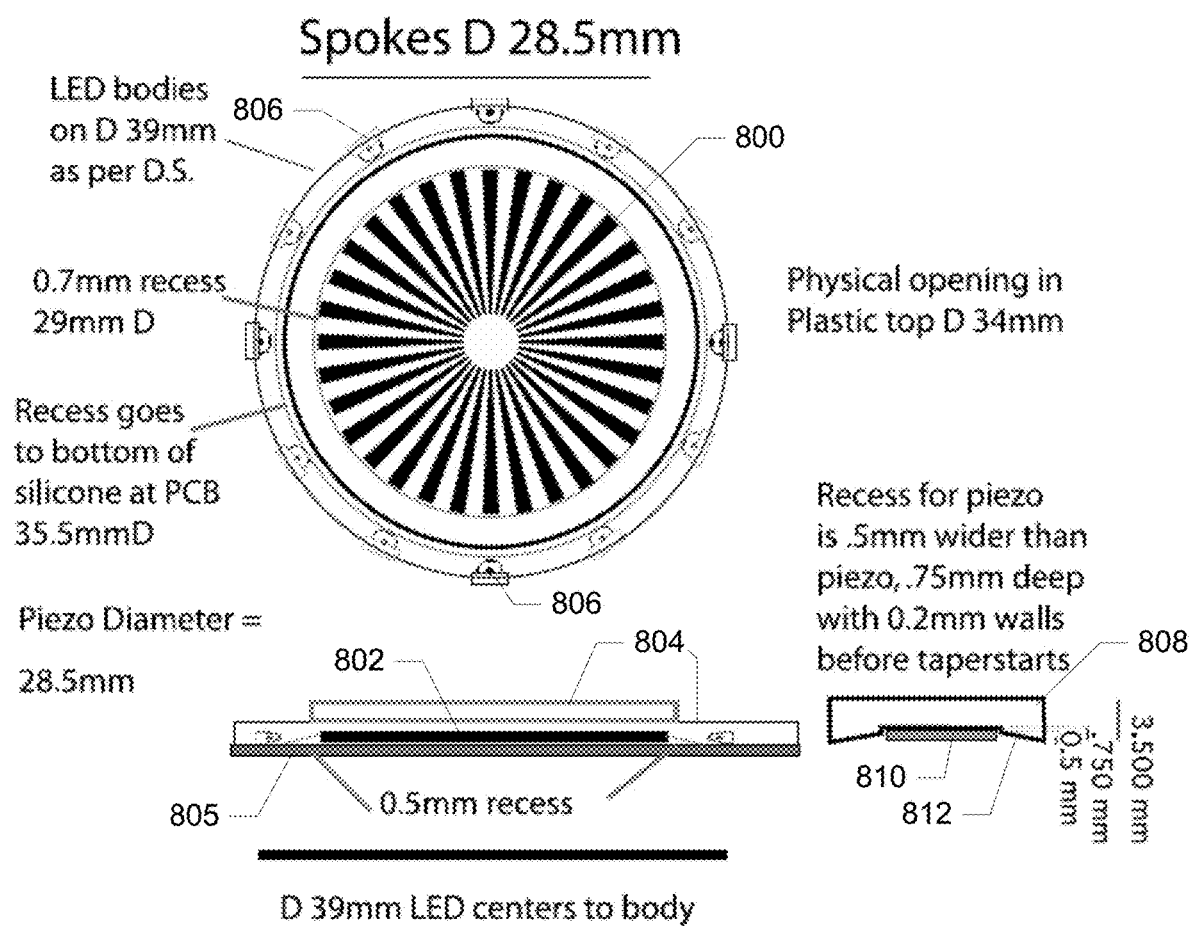

An example of the relationship of a silicone layer to an underlying sensor configuration is shown in FIG. 8. The sensor configuration is a circular array 800 of driven/scanned conductive elements, e.g., as discussed above with reference to FIG. 5A. Recessing the piezoresistive material 802 into the silicone layer 804 above the conductive elements on PCB 805 keeps the piezoresistive material 802 slightly off contact with the conductive elements (e.g., about 0.008") which creates a distinctive change in the values read by the ADC when the silicone layer above a given area of the sensor is touched. Increasing pressure on the silicone increases the readings of the ADC. Keeping the piezoresistive material close to the conductive elements with a sufficient silicone layer above the piezoresistive material facilitates transfer of the light from indicator LEDS 806 over the top of the conductive elements.

FIG. 8 also shows a cross-sectional view of a silicone layer 808 with piezoresistive material 810 in a recess in the underside of silicone layer 808. The view illustrates a taper 812 on either side of the piezoresistive material (also present in the cross-sectional view including elements 802 and 804) that allows silicone layer 808 to travel when compressed. It should be noted that this cross-section is not to scale, and may be illustrative of the relationships between the piezoresistive material and the silicone layer for any of the sensors of any of the implementations described herein.

According to a particular class of implementations, position and pressure information generated using appropriately configured sensors (such as those described herein and suitable alternatives) may be used to provide sophisticated types of control. For example, changes in position and/or pressure on a particular sensor may be used to modulate control information around one or more quantized states associated with the sensor. A particular example in the context of a musical effects controller is when a sensor is configured as a piano or synthesizer key. In such a case, changes in position and/or pressure, e.g., when the user wiggles or slides his finger back and forth, can be used to distort or modulate the pitch of the primary note associated with the key, e.g., to effect note bending or vibrato.

Figure 9:
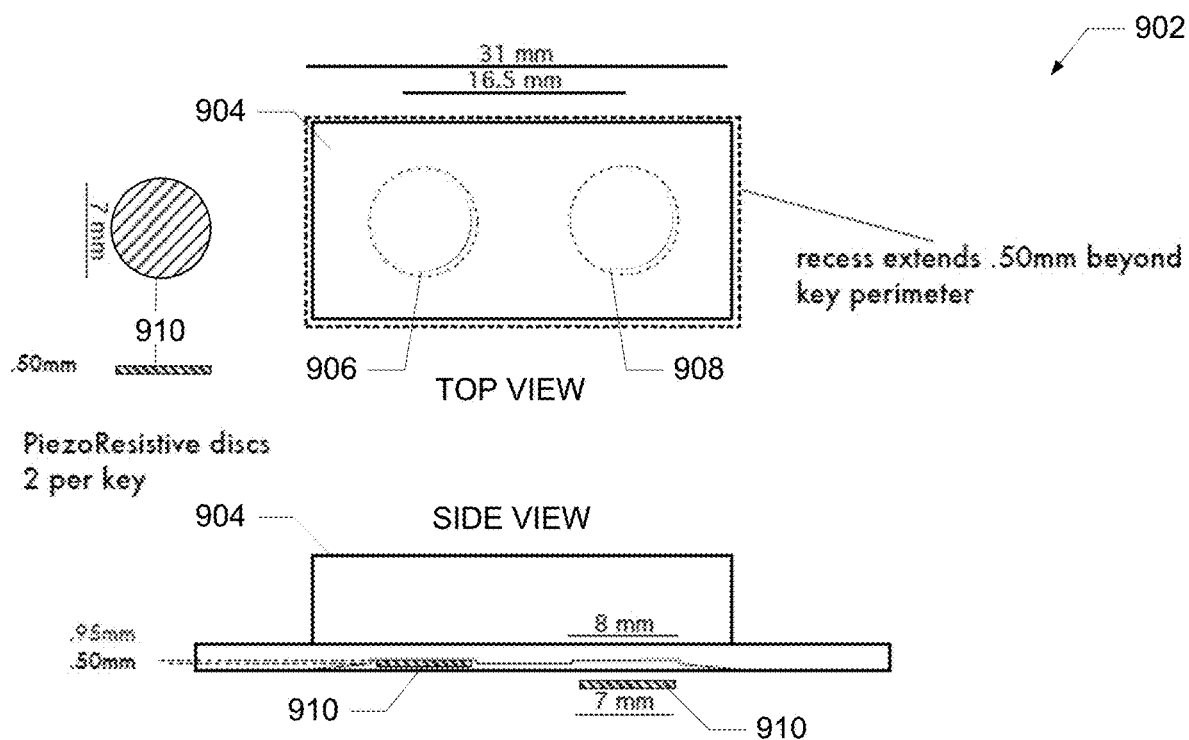

According to one such implementation illustrated in FIG. 9, a two-sector sensor 902 is implemented to have a top and a bottom sector of a key, e.g., the top and bottom halves each having a sensor implemented as described with reference to FIG. 6 or 7. The silicone keypad 904 has two recesses 906 and 908 in the underside of the keypad for holding piezoresistive elements, e.g., piezoresistive discs 910.

When the key is activated, e.g., by a touch event, one or both of the piezoresistive discs contact the underlying conductive elements of the sensor(s), and the control information is mapped to the primary quantized state associated with the key, i.e., the corresponding note is reproduced. An initial absolute value is generated representing the difference between the signal(s) generated by the top and bottom sensors. An offset is added to the initial absolute value to define an activation threshold. After a period of delay from when the key is first declared active, real-time absolute values calculated like the initial value are streamed from the key and compared to the activation threshold. If the activation threshold is exceeded, e.g., because the user is rocking the key back and forth by wiggling his finger, the microprocessor maps the correspondingly modulated control information received from the key (i.e., the pressure and/or position information) to the desired effect, e.g., note bending, vibrato, etc.

For more information on materials and sensor configurations that may be used with various implementations, as well as software and devices that may be controlled, please refer to U.S. patent application Ser. No. 12/904,657 entitled Foot-Operated Controller filed on Oct. 14, 2010, the entire disclosure of which is incorporated herein by reference for all purposes.

At least some implementations include an array of LEDs to illuminate the sensor array and employ a scheme for driving the array in a way that allows hundreds of LEDs to be driven off limited current, e.g., the current available from a USB connection. A particular implementation of a controller (e.g., QuNeo 100 of FIG. 1) employs an array of 251 LEDs as shown in FIG. 9 to provide visual feedback to the user. LED array 900 is a PCB layout in which various of the LEDs may be selectively illuminated, e.g., under control of a microprocessor (not shown). One of the design requirements of the depicted implementation is that the controller be safely powered from a USB-2 device host or supply. The electrical specifications for USB-2 include 5V power rails capable of providing up to 500 mA of current for a total of 2.5 watts.

A practical way to control 251 LEDs is to create a 16 by 16 matrix that sources and sinks current for groups of 16 LEDs at a time. This reduces the best case duty cycle or time that the LED is on to $1/16$th. Regular efficiency LEDs are $1/3$rd the cost of high efficiency LEDs and the LED cost is the dominant component of the product's overall component cost. One problem is how to gain maximum brightness without exceeding the 2.5 watts of available USB power using standard efficiency LEDs; particularly given the fact that not all of this 2.5 watts can be dedicated to LED illumination as the QuNeo must perform other functions. Providing the 16 LEDs with a maximum of 30 mA of current at the $1/16$th duty cycle may result in a display that is insufficiently bright for many applications.

Figure 10:
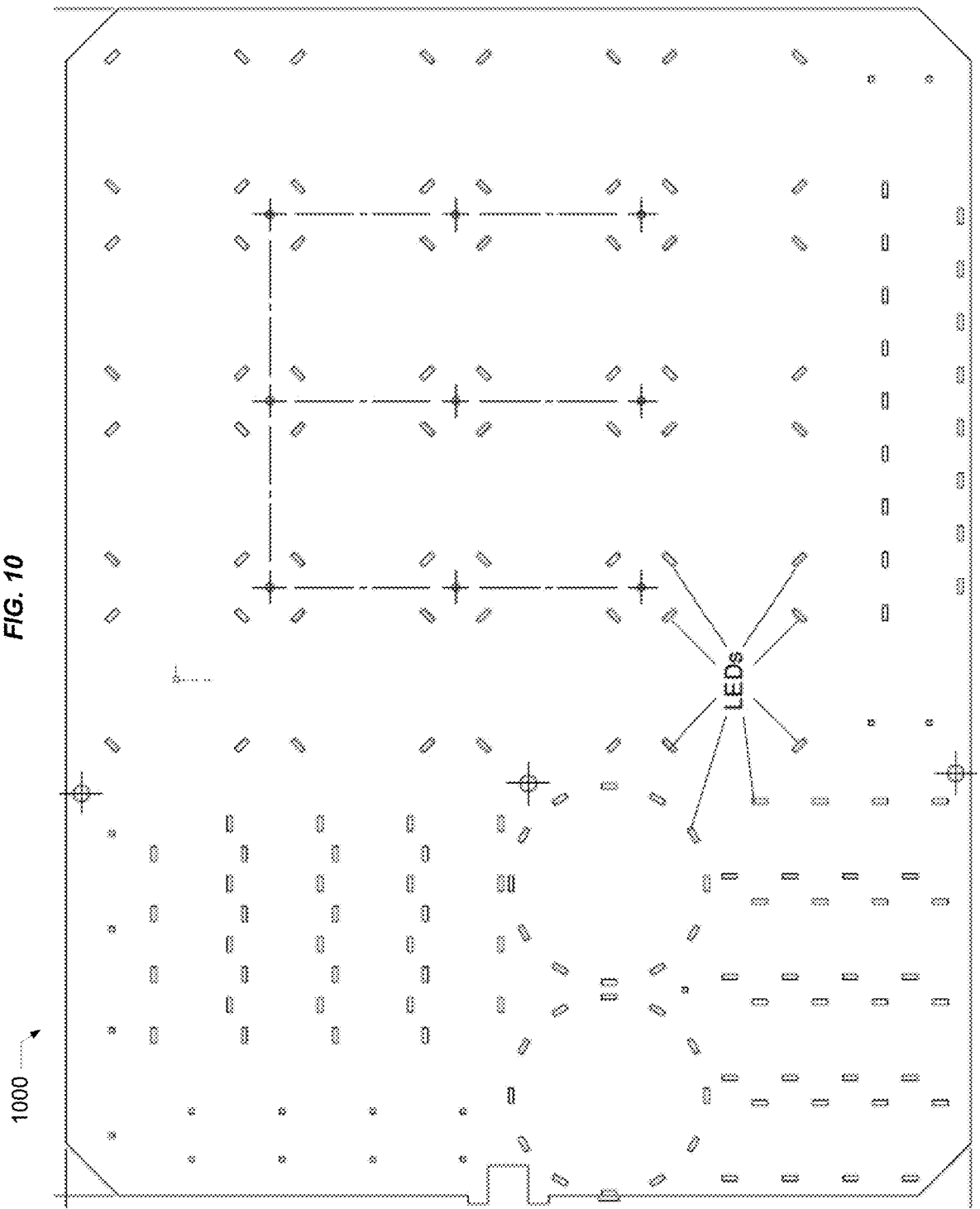
FIG. 10 is a top view of a layout of an array of LEDs for use with a particular implementation of a controller.

While 30 mA is the rated steady state current maximum of regular commercially available LEDs, most can accept a current spike of up to 150 mA for ~100 microseconds. Heat is the limiting factor for steady state current drive, but the LED can be driven brighter for a brief period of time. Therefore, according to a particular class of implementations, a drive circuit is provided for accomplishing the drive current shown in FIG. 10A for each LED within a matrix of source rows and sink columns. One implementation of such a drive circuit is shown in FIG. 10B.

The parallel R and C associated with each LED (e.g., R1 and C1 associated with LED1) provides a brief near DC path to ground creating a limited current spike for each of the LEDs when switched on from an off state. As the duration of the spike is limited by the charge time of the capacitor, no other supervisory or switching circuitry is required, no increase in processor overhead is created, and component cost is minimal. This design not only increases the brightness of the LEDs, it also allows LED refresh cycles to be much shorter than they would otherwise have to be in order to create the desired level of brightness. This possibility of fast refresh rates allows opportunities for more sophisticated display techniques (such as dimming and color-mixing) that are normally only possible with a costly and component-heavy design.

According to a particular implementation, the default refresh rate for a 16×16 LED matrix is ~1000 Hz. By skipping refresh opportunities, the LEDs may be dimmed in a controllable manner. 1000 Hz also allows 16 levels of brightness as well as Off, with no discernible flickering perceived even at low brightness levels. This feature allows the device to respond to a wide range of inputs with a complex and nuanced visual display without exceeding current limit requirements or adding significantly to the cost of the controller.

As is well known, there are two dominant switch or pad layouts used in the conventional musical controller world. One is a 4×4 array of drum pads in which sixteen different drum sounds are mapped 1:1 to the sixteen pads. Hitting a pad causes the corresponding drum sound to be produced. Another popular controller uses an array of 8×8 switches that can be configured, for example, to trigger corresponding audio files, or to determine which one of 8 beats of a rhythm is generated (horizontal pads) for each of 8 different instruments (vertical pads).

Figure 11A:
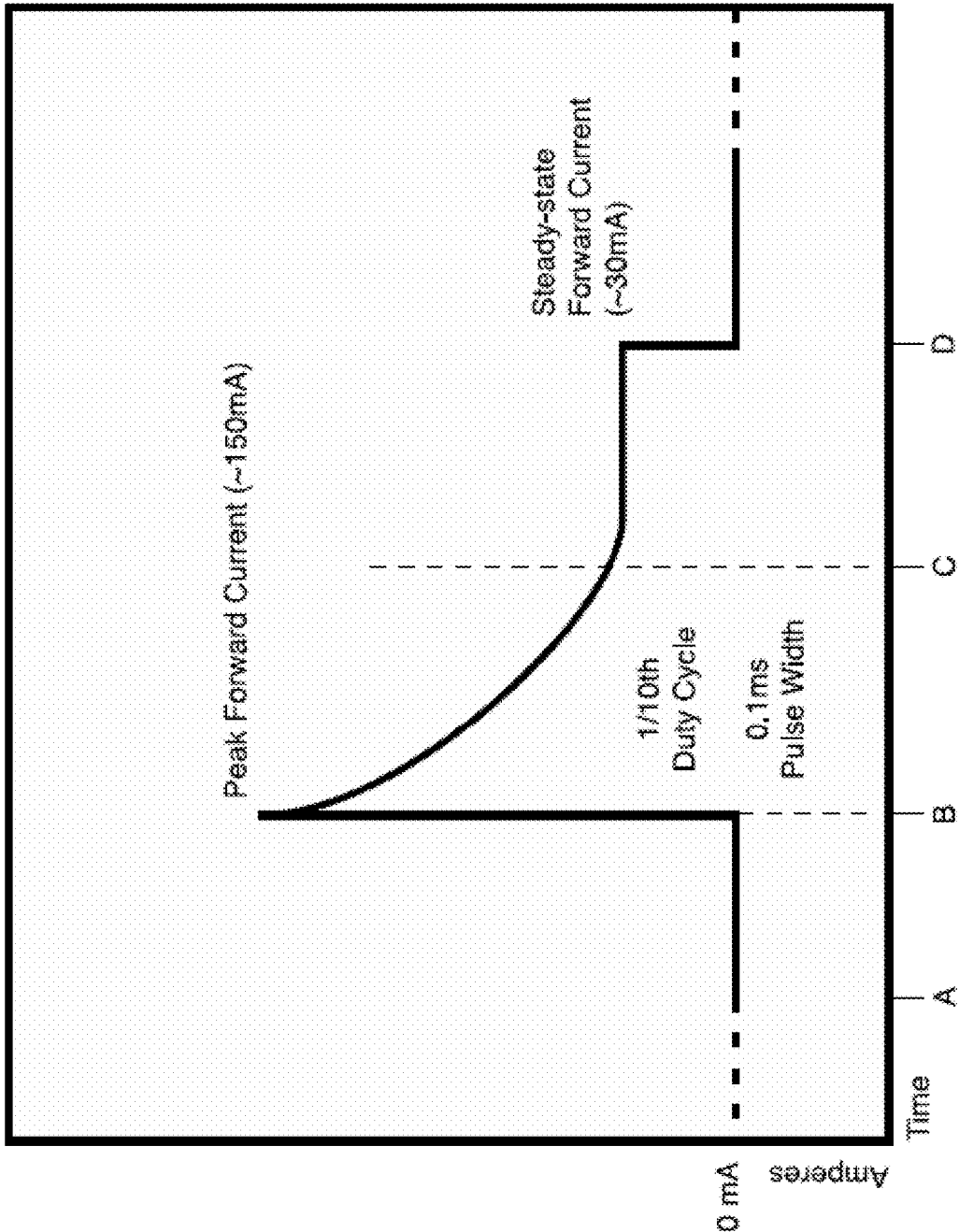
FIGS. 11A and 11B illustrate a drive current and a drive circuit for driving LEDs associated with a particular implementation of a controller.
Figure 11B:
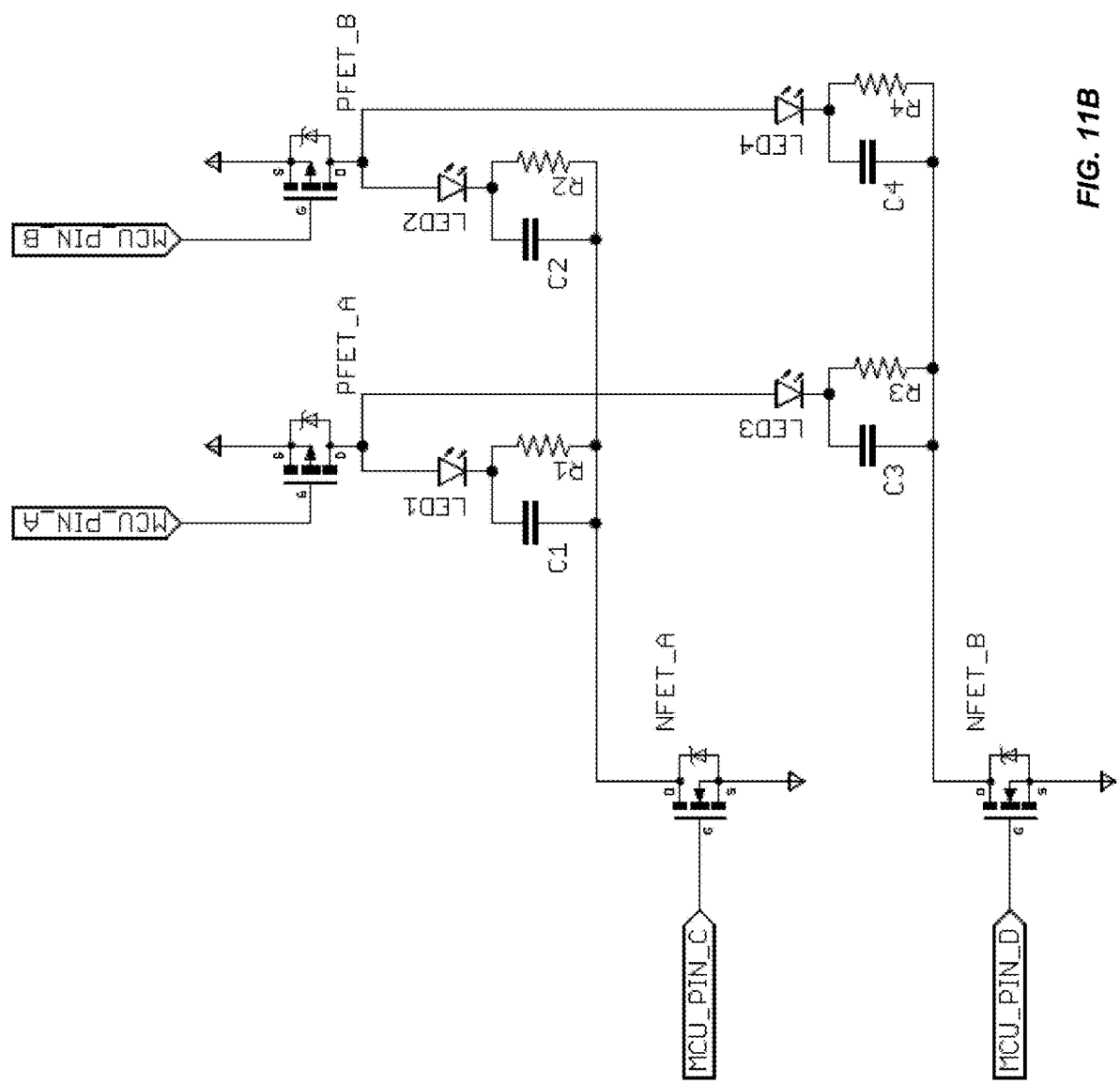

According to a particular class of implementations and as illustrated in FIG. 11, an array of sixteen 4-quadrant QuNeo sensors may be configured to operate as either a 4×4 sensor array (e.g., array 1102) or an 8×8 sensor array (e.g., array 1104), thus combining the functionality of both types of conventional controllers in a single device. That is, because each of the 16 pads of a particular QuNeo implementation may behave as a positional sensor and includes bicolor LEDs in each corner, each pad can operate as a single sensor, e.g., as a drum-style trigger, or as a set of four pressure-sensitive switches, thus providing the utility of both a 4×4 array and an 8×8 array. The LEDs may be selectively illuminated to provide visual feedback to the user as to the current configuration.

According to some implementations, QuNeo may be configured to power up with presets that emulate the functionality of popular drum pad and grid controllers. For example, in the traditional drum pad mode, QuNeo may behave like an Akai MPD/MPC pad controller configured for dynamic electronic drumming and pad based sequencing. For example, QuNeo may be set up similar to a standard drum pad controller, with four sets of notes from C2 to E7. An appropriate velocity value may be associated with each note. 16 notes may be playable (1 per pad), e.g., starting from the bottom left and ascending chromatically to the right and toward the top.

Alternatively, as a grid controller, the QuNeo may emulate popular 8×8 grid based controllers like the Monome and Novation's Launchpad. Monome style sequencing and sample manipulation is readily emulated, with the added bonus of pressure output for each of the 64 steps. In another example, clip launching in Ableton Live is also easily supported while operating as a grid controller, with 64 possible clips per bank. Multi color LEDs, also in an 8×8 grid, may act as indicators for beats and playing/recording.

According to a particular class of implementations, QuNeo may be configured to work with a wide variety of third-party software and/or devices. This versatility is enabled through the installation of ancillary code into the third-party software to enable the mapping of QuNeo's high-density control information to existing music applications, e.g., synthesizers, DJ applications, recording applications, etc.

Such implementations of QuNeo have a variety of associated templates that allow QuNeo to integrate and work with the various third-party software. These templates facilitate installation of Python script code into the third-party software that maps the QuNeo control information to the inputs recognized by the interface stack of the third-party software. When the QuNeo software is activated (e.g., on a user's PC as downloaded from the web), the user is presented with a list of third-party software. When the user selects one or more options with which he wants the QuNeo to work, the installer finds the selected software and installs the necessary scripts. Corresponding manuals may also be loaded which explain how to use the QuNeo to control the selected software.

Figure 12:
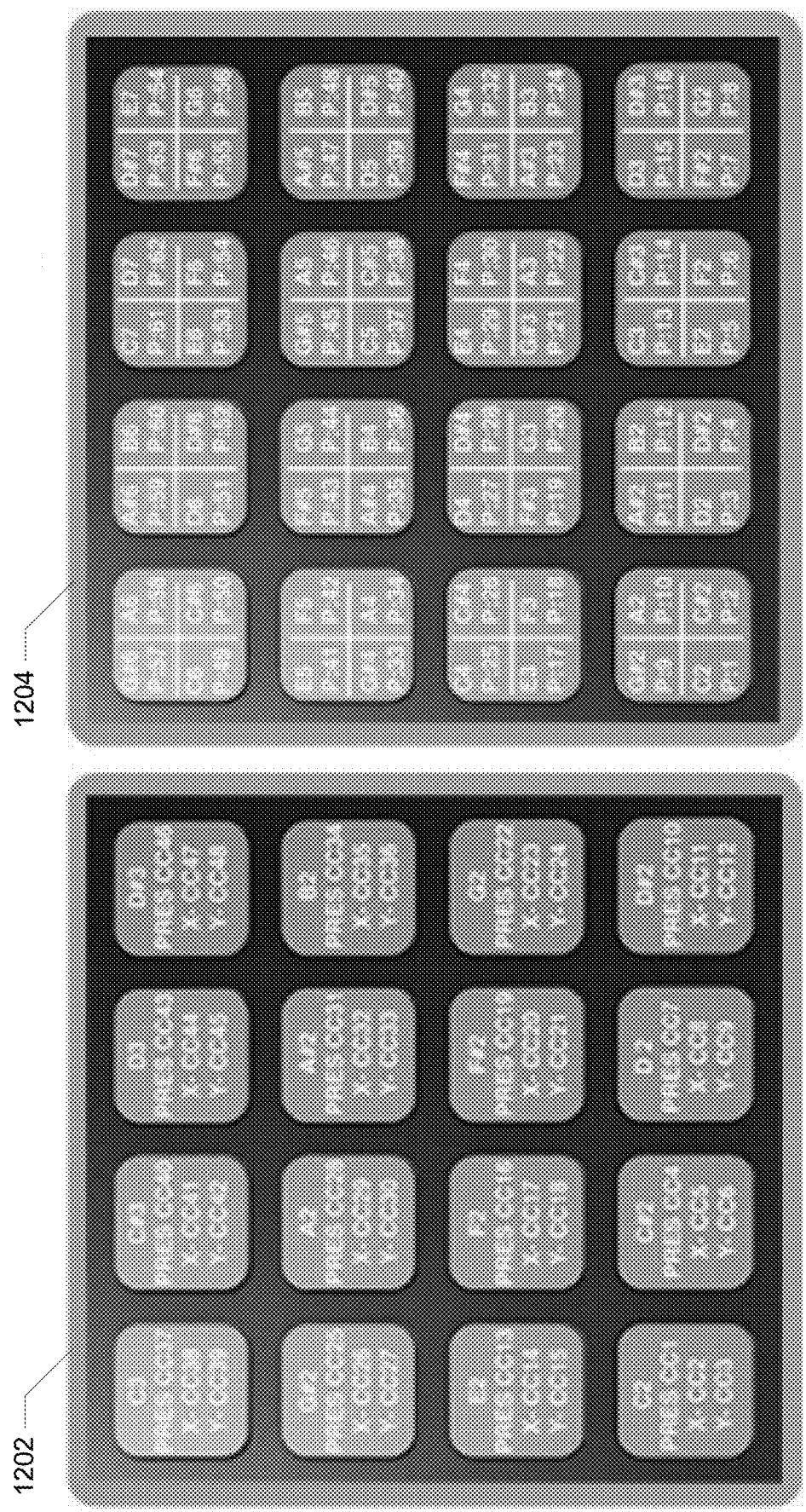
FIG. 12 shows two different configurations of an array of control pads of a particular implementation of a controller.

QuNeo has the potential to interface with many different software applications since it is a class-compliant MIDI device with control information mappings to complement many of the most popular pieces of software. When the user installs QuNeo software (e.g., downloaded to his PC from the web), the user is prompted to select from among the available software templates as shown in screenshot 1200 of FIG. 12. Each option on the list has an associated group of files that save the user setup time, providing an easy "out-of-box" experience for the user in connecting QuNeo with their favorite software application.

For example, if the user selects the Ableton Live template, an Ableton Live example file is put into the user's install directory along with an automatically installed QuNeo Editor and associated documentation. The example file includes sounds the user can try out to illustrate the way in which QuNeo is initially set up to control the Ableton Live software. Selection of the Ableton Live template also results in installation of a group of remote mapping files. These mapping files control which of the application's functions are triggered when data are received from QuNeo. For example, when a certain button on QuNeo is pressed, the application's play button is triggered). In the case of Ableton Live, the mapping files are Python scripts. However, it should be noted that the mapping file format may vary from application to application.

Figure 13:
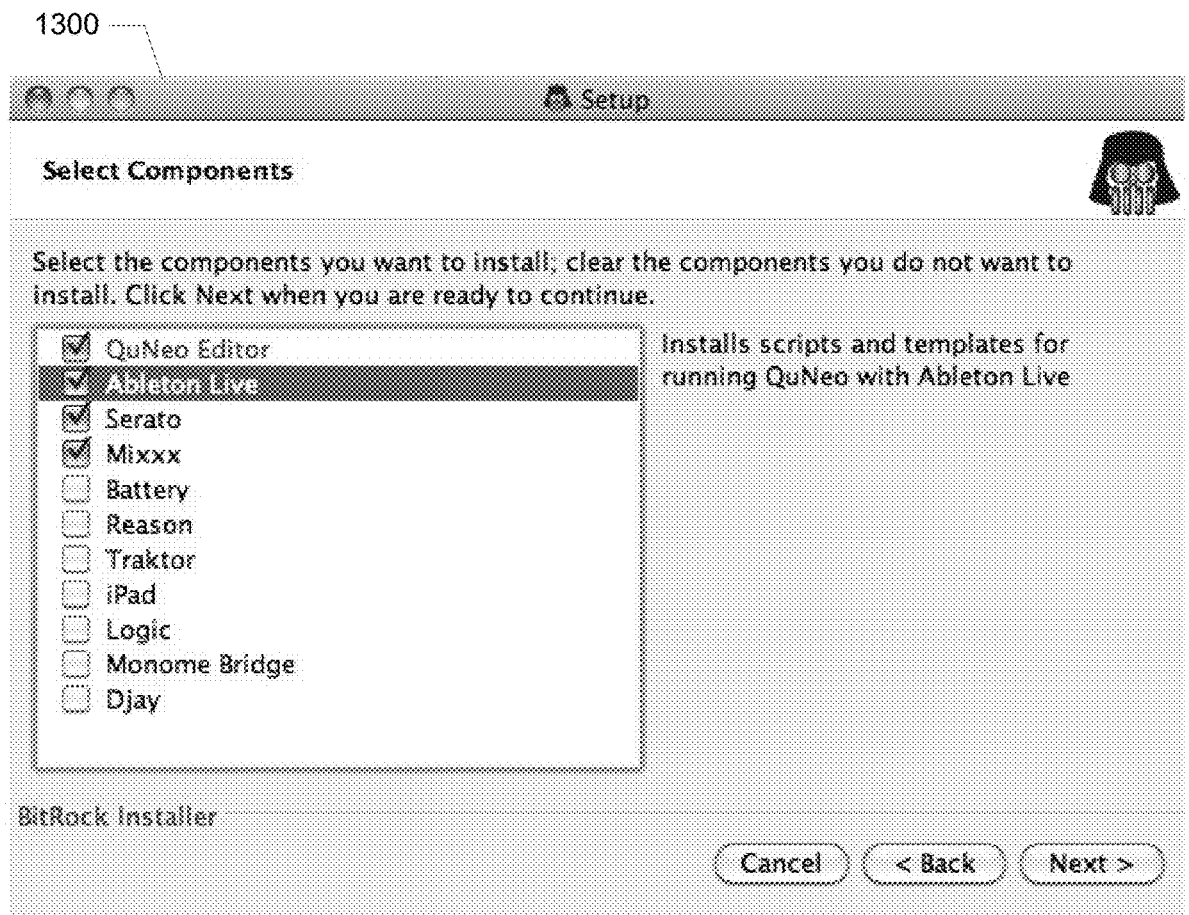
FIGS. 13-17 show examples of interfaces for facilitating configuration of a controller to interact with a variety of software applications.

The installer places the remote mapping files in a location on the user's computer where the corresponding application can find them and interact with them accordingly. The location may be a default, in the user's Applications folder on a Mac. Alternatively, this may be accomplished by asking the user to browse to a particular directory—usually to the location of the selected application itself—as shown in screenshot 1300 of FIG. 13.

Figure 14:
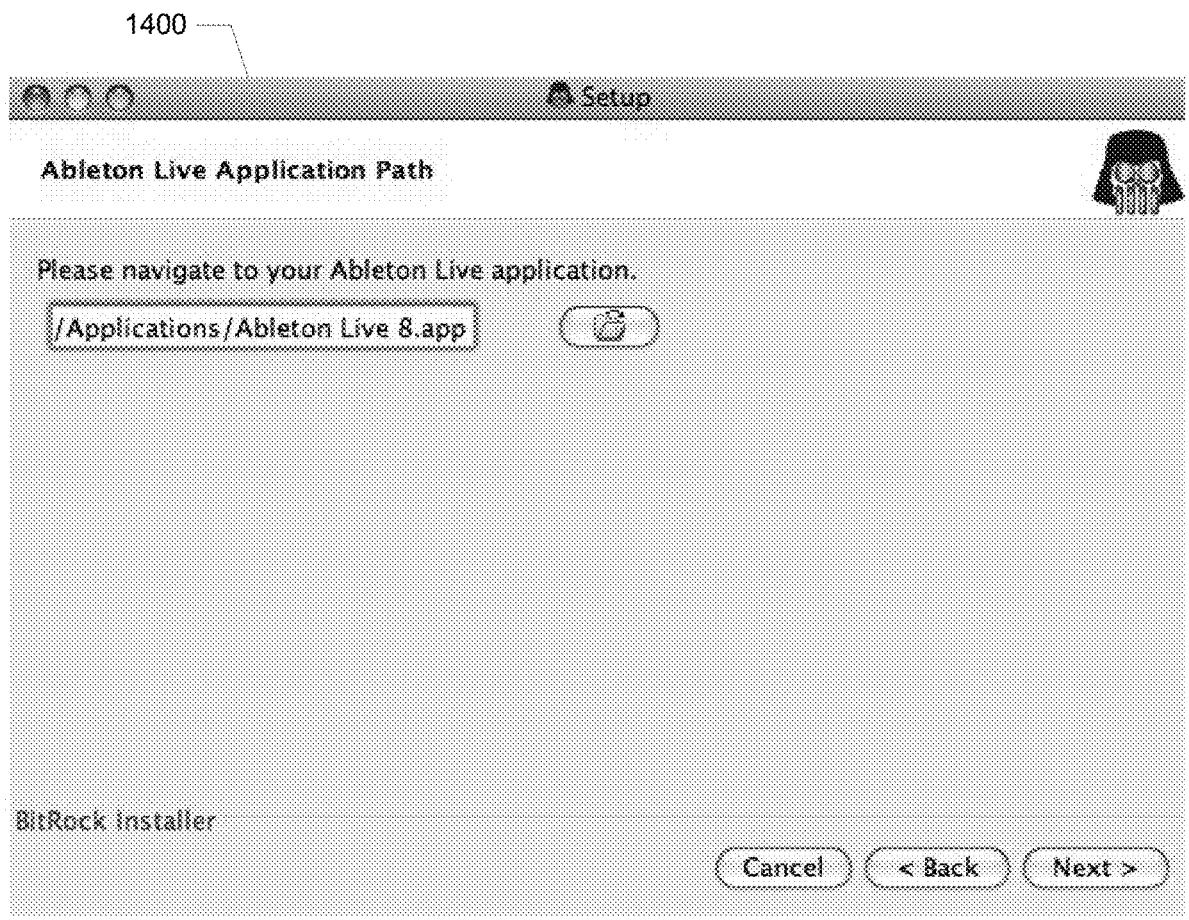

There is some error checking in place to make sure the user doesn't accidentally select the wrong location, and then the remote mapping files are copied into the selected location. In the case of Ableton Live, the Python scripts go into a folder within the application where other supported controller scripts typically exist (e.g., as shown in screenshot 1400 of FIG. 14). In this way, the application will then recognize QuNeo as a supported control surface when it is next launched.

Figure 15:
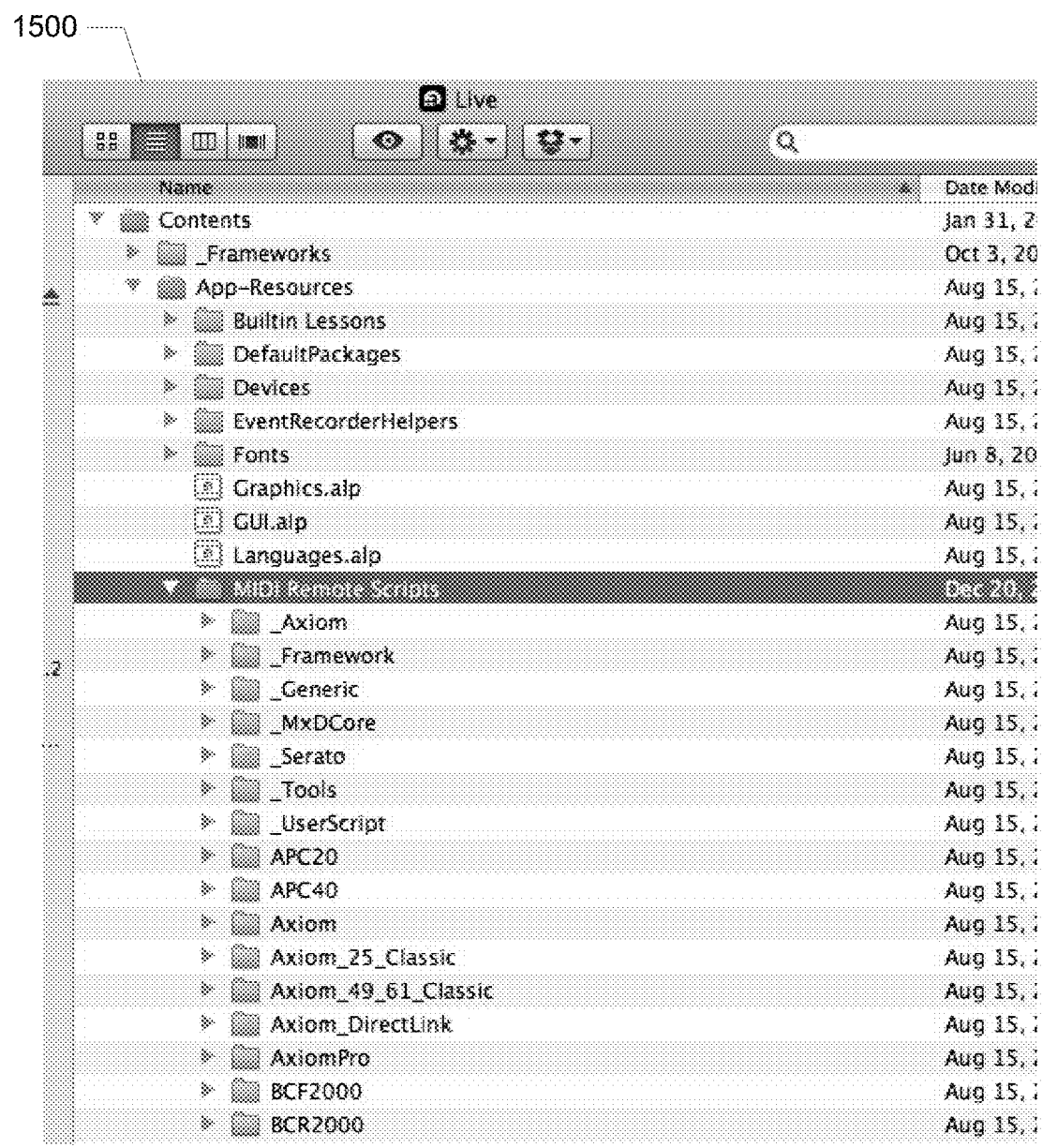

A copy of the remote mapping files may also be placed in the install directory in case there is an error during installation, if the user wants to manually add the files to a different version of Ableton Live, or in case they are just curious to look at them. The install directory might end up looking like screenshot 1500 of FIG. 15. As shown, there is a folder within the Software Templates folder for each application the user selects. The folder Ableton Live 1.1 contains the folder Installation Files (which holds the extra copy of the Ableton Live remote mapping files), the Quick-start guides documenting how to use the Ableton Live template, and the example file containing sounds for the user to try out ("QuNeoDemo Project").

As is well known, Ableton Live is for electronic music performance and composition. Another example of third-party software that may be controlled using QuNeo is Mixxx—a free DJ program. The Mixxx template allows users to play the rotary sensors like turntables, create loops using the pads, and, in turn Mixxx control information is used to control the QuNeo LEDs. So, with a single purchase, i.e., the QuNeo, the user has everything he needs to start DJ-ing right away. Mixxx uses a different file format to keep track of its commands. To recognize QuNeo as a controller Mixxx needs two files with very particular names placed into its MIDI folder called "KMI QuNeo.midi.xml" and "KMI-QuNeo-scripts.js." When Mixxx sees these two files it creates an option in its menu of MIDI controllers called "KMI QuNeo." When the user selects this option, QuNeo is configured to control the Mixxx application in the way defined by these two files.

Figure 16:
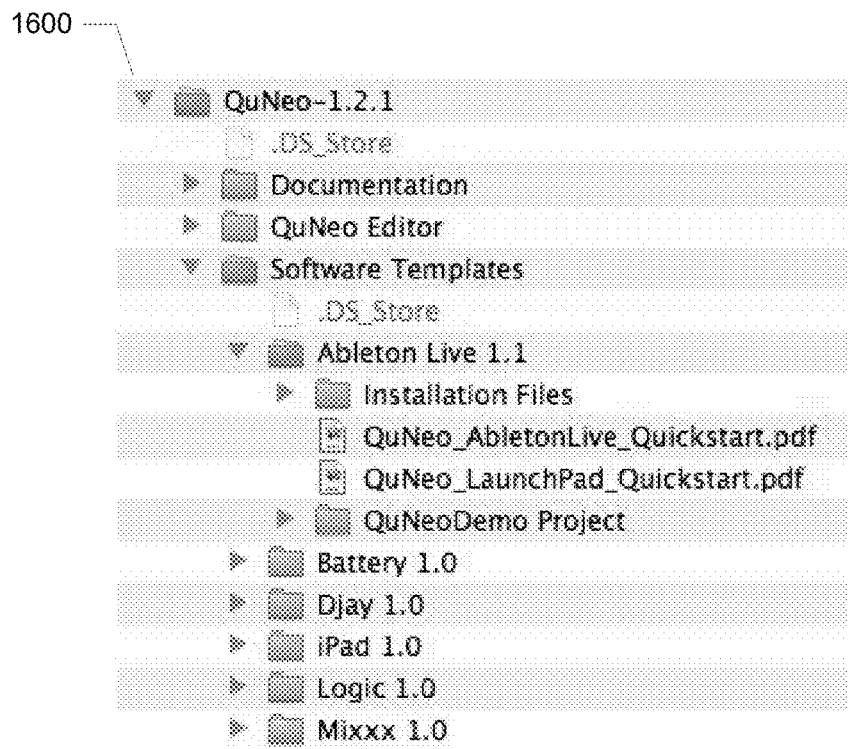
Figure 17:
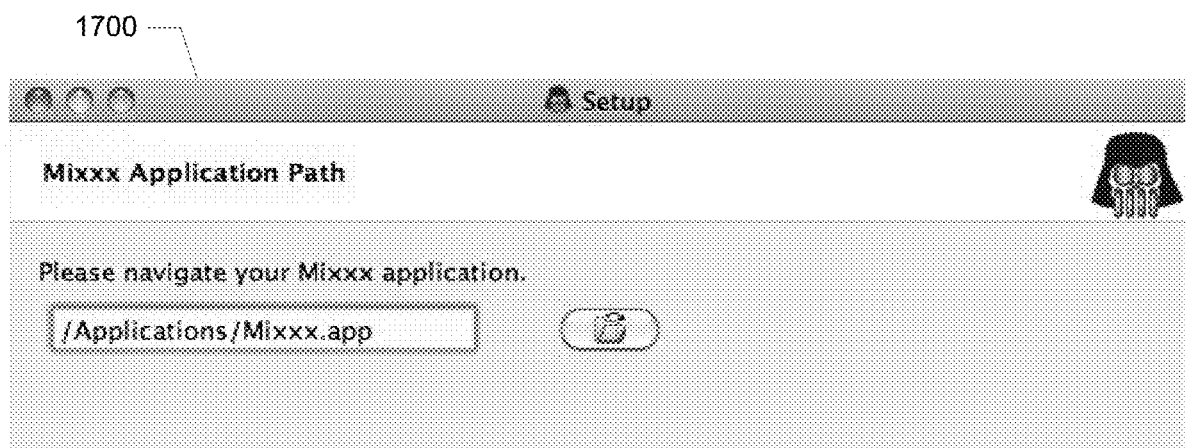

If the user decides to install the Mixxx template in screenshot 1200, he is again prompted to navigate to the location of his Mixxx application (as illustrated in screenshot 1600 of FIG. 16) to find the location where these two remote mapping files should be stored. Finally, a folder called Mixxx 1.0 is created inside of the user's Software Templates folder (see screenshot 1500) holding a Quickstart guide to explain how to use the template, and a copy of the two Remote Files just in case the user needs to move them in manually, or edit them in some way. In this way, the user can quickly configure his QuNeo to control his existing software.

It should be noted that, despite references to particular computing paradigms and software tools herein, the computer program instructions with which embodiments of the invention may be implemented may correspond to any of a wide variety of programming languages, software tools and data formats, and be stored in any type of volatile or nonvolatile, non-transitory computer-readable storage medium or memory device, and may be executed according to a variety of computing models including, for example, a client/server model, a peer-to-peer model, on a stand-alone computing device, or according to a distributed computing model in which various of the functionalities may be effected or employed at different locations. In addition, reference to particular protocols herein are merely by way of example. Suitable alternatives known to those of skill in the art may be employed without departing from the scope of the invention.

While the invention has been particularly shown and described with reference to specific embodiments thereof, it will be understood by those skilled in the art that changes in the form and details of the disclosed embodiments may be made without departing from the spirit or scope of the invention. For example, implementation have been described herein in which sensors are implemented in which piezoresistive material is brought into contact with conductive elements on an underlying PCB. However, it should be noted that implementations are contemplated in which the elements on the PCB themselves include or are constructed with piezoresistive material, and the overlying material that contacts the PCB elements may be conductive and/or piezoresistive.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A system, comprising:
a substrate;
a plurality of conductive elements arranged on a same surface of the substrate;
piezoresistive material in contact with the conductive elements;
a surface through which mechanical force is transmitted to the piezoresistive material; and
circuitry configured to drive a first subset of the conductive elements sequentially, and to receive signals from a second subset of the conductive elements, the circuitry being further configured to determine a first location of a first object in contact with the surface by interpolating first values derived from a first subset of the signals, and to determine a first force exerted by the first object based on a combination of the first values.

2. The system of claim 1, wherein the circuitry is further configured to determine a second location of a second object in contact with the surface simultaneously with the first object based on second values derived from a second subset of the signals.

3. The system of claim 2, wherein the circuitry is configured to determine the second location by interpolating the second values, and to determine a second force exerted by the second object based on a combination of the second values.

4. The system of claim 2, wherein the circuitry is further configured to detect a user interface gesture representing movement of the first and second objects across the surface based on the signals.

5. The system of claim 1, wherein the piezoresistive material comprises one or more of germanium, polycrystalline silicon, amorphous silicon, single crystal silicon, or fabric.

6. The system of claim 1, wherein the conductive elements are arranged on the substrate in an array, and wherein the array is one of a linear array, a circular array, or a rectilinear array.

7. The system of claim 1, wherein the circuitry is configured to interpolate the first values using a centroid calculation.

8. The system of claim 1, wherein the circuitry is further configured to determine a change in the first location and/or the first force, and to modulate control information around one or more quantized states based on the change.

9. The system of claim 1, wherein the circuitry is further configured to generate a representation of movement of the first object across the surface based on the signals.

10. The system of claim 1, wherein the piezoresistive material is continuous and in contact with all of the conductive elements.

11. The system of claim 1, wherein the piezoresistive material includes a plurality of pieces of the piezoresistive material, each of the pieces of piezoresistive material being in contact with a corresponding subset of the conductive elements.

12. The system of claim 1, wherein the system includes additional pluralities of conductive elements on the substrate, each of the pluralities of conductive elements corresponding to one of a plurality of sensors, the circuitry being further configured to control operation of each of the sensors independently.

13. A system, comprising:
a substrate;
a plurality of conductive elements arranged on a same surface of the substrate;
piezoresistive material in contact with the conductive elements;
a surface through which mechanical force is transmitted to the piezoresistive material; and
circuitry configured to drive a first subset of the conductive elements sequentially, and to receive signals from a second subset of the conductive elements, the circuitry being further configured to detect a first touch event of a first object in contact with the surface based on first values derived from a first subset of the signals, and to determine a second touch event of a second object in contact with the surface simultaneously with the first object based on second values derived from a second subset of the signals.

14. The system of claim 13, wherein the circuitry is configured to determine a first location of the first touch event by interpolating the first values, and to determine a first force associated with the first touch event based on a combination of the first values.

15. The system of claim 14, wherein the circuitry is configured to interpolate the first values using a centroid calculation.

16. The system of claim 14, wherein the circuitry is further configured to determine a change in the first location and/or the first force, and to modulate control information around one or more quantized states based on the change.

17. The system of claim 13, wherein the piezoresistive material comprises one or more of germanium, polycrystalline silicon, amorphous silicon, single crystal silicon, or fabric.

18. The system of claim 13, wherein the conductive elements are arranged on the substrate in an array, and wherein the array is one of a linear array, a circular array, or a rectilinear array.

19. The system of claim 13, wherein the circuitry is further configured to detect movement of the first and second objects across the surface based on the signals.

20. The system of claim 19, wherein the circuitry is further configured to detect a user interface gesture representing the movement of the first and second objects.

21. The system of claim 13, wherein the piezoresistive material is continuous and in contact with all of the conductive elements.

22. The system of claim 13, wherein the piezoresistive material includes a plurality of pieces of the piezoresistive material, each of the pieces of piezoresistive material being in contact with a corresponding subset of the conductive elements.

23. The system of claim 13, wherein the system includes additional pluralities of conductive elements on the substrate, each of the pluralities of conductive elements corresponding to one of a plurality of sensors, the circuitry being further configured to control operation of each of the sensors independently.

\* \* \* \* \*